United States Patent [19]
Ohki

[11] Patent Number: 5,410,500
[45] Date of Patent: Apr. 25, 1995

[54] DISCRETE COSINE TRANSFORM APPARATUS AND INVERSE DISCRETE COSINE TRANSFORM APPARATUS

[75] Inventor: Mitsuharu Ohki, Tokyo, Japan

[73] Assignee: Sony Corporation, Japan

[21] Appl. No.: 20,313

[22] Filed: Feb. 19, 1993

[30] Foreign Application Priority Data

Feb. 21, 1992 [JP] Japan .................................. 4-035149
Jul. 17, 1992 [JP] Japan .................................. 4-191113

[51] Int. Cl.6 .............................................. G06F 7/38
[52] U.S. Cl. .................................. 364/750.5; 364/725; 364/754
[58] Field of Search ................ 364/725, 750.5, 780; 382/13

[56] References Cited

U.S. PATENT DOCUMENTS

| | | | |
|---|---|---|---|
| 4,134,134 | 1/1979 | Lux ..................................... | 358/280 |
| 4,293,920 | 10/1981 | Merola . | |
| 4,481,605 | 11/1984 | Chase .................................. | 364/719 |
| 4,621,337 | 11/1986 | Cates et al. ........................ | 364/727 |
| 4,791,598 | 12/1988 | Liou et al. . | |
| 4,829,465 | 5/1989 | Knauer et al. . | |
| 4,839,844 | 6/1989 | Watari ................................. | 364/727 |
| 4,841,464 | 6/1989 | Guichard et al. .................. | 364/725 |
| 4,866,653 | 9/1989 | Kulisch et al. ..................... | 364/748 |
| 4,914,615 | 4/1990 | Karmarkar et al. ............... | 364/754 |
| 5,001,663 | 3/1991 | Parulski et al. .................... | 364/760 |
| 5,007,100 | 4/1991 | D'Aoust et al. .................... | 382/49 |
| 5,008,848 | 4/1991 | Akiwumi-Assani ............... | 364/727 |
| 5,054,103 | 10/1991 | Yasuda . | |
| 5,126,962 | 6/1992 | Chiang . | |
| 5,197,021 | 3/1993 | Cucchi et al. ...................... | 364/725 |
| 5,227,994 | 7/1993 | Mitsuharu ......................... | 364/750.5 |
| 5,249,146 | 9/1993 | Uramoto et al. .................. | 364/725 |
| 5,257,213 | 10/1993 | Kim et al. .......................... | 364/725 |

FOREIGN PATENT DOCUMENTS

| | | |
|---|---|---|
| 375868 | 3/1991 | Japan . |
| 3102567 | 4/1991 | Japan . |
| 3186969 | 8/1991 | Japan . |
| 2205710A | 12/1988 | United Kingdom . |

OTHER PUBLICATIONS

"IEEE Journal of Solid-State Circuits", vol. 27, No. 4, Apr. 1992, pp. 492 to 498.

Primary Examiner—Roy N. Envall, Jr.
Assistant Examiner—Emmanuel Moise
Attorney, Agent, or Firm—Ronald P. Kananen

[57] ABSTRACT

Input data of 8 rows and 8 columns are input from an input terminal (IN) in the sequential order of columns and supplied through a first rearranging circuit (41) of 64 words to a 4-degree first inner product calculating circuit (42). An output of this inner product calculating circuit (42) is supplied through a second rearranging circuit (43) of 64 words to an 8 degree second inner product calculating circuit (44). An output of the inner product calculating circuit (44) is supplied to a 4-degree third inner product calculating circuit (45), and an output of the inner product calculating circuit (45) is delivered through a rearranging circuit (46) to an output terminal (OUT). Therefore, the inner product calculating circuit can be reduced in circuit scale, the circuit arrangement can be simplified and the number of calculation can be reduced to thereby enable a high speed calculation to be carried out.

4 Claims, 34 Drawing Sheets

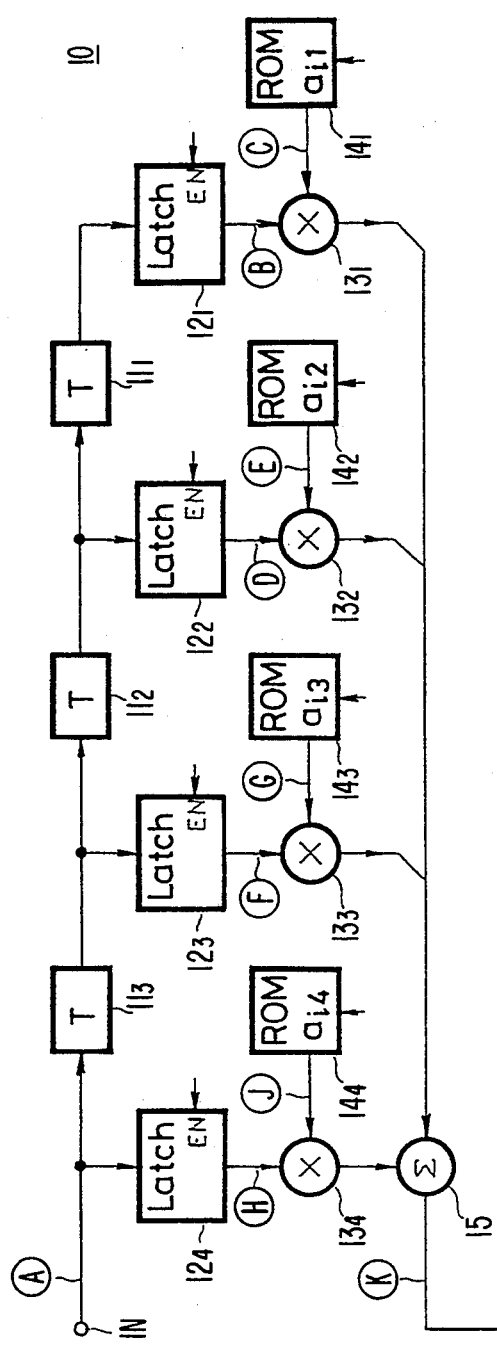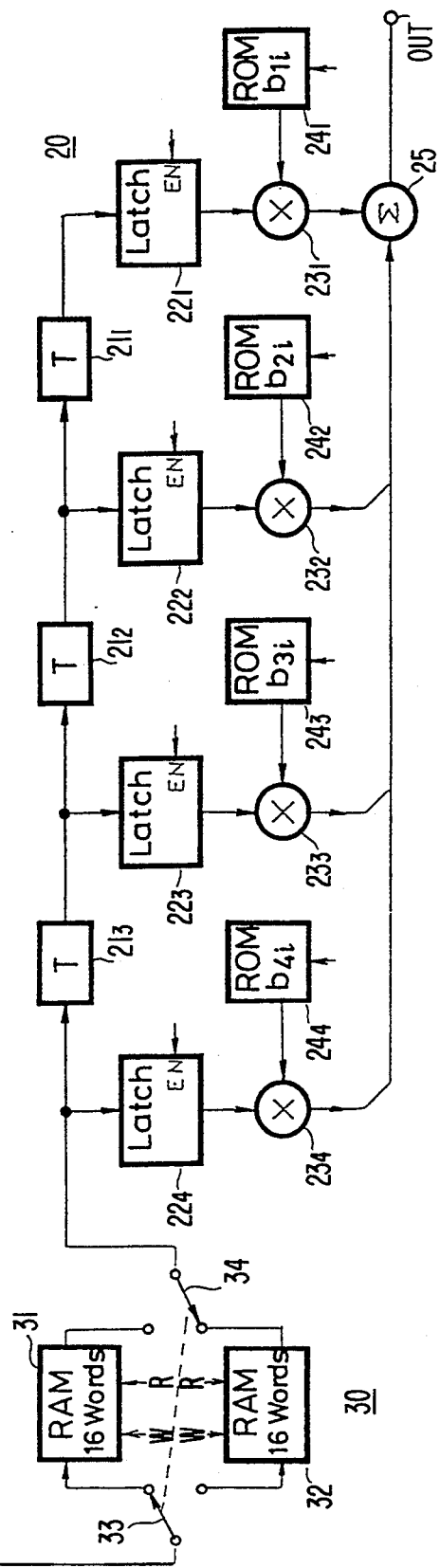
FIG. 1 (PRIOR ART)

FIG. 4A $$\{X_C\} \equiv \begin{Bmatrix} x_{11} \\ x_{21} \\ x_{31} \\ \vdots \\ x_{81} \\ x_{12} \\ x_{22} \\ \vdots \\ x_{78} \\ x_{88} \end{Bmatrix}$$

FIG. 4B $$\{Y_C\} \equiv \begin{Bmatrix} y_{11} \\ y_{21} \\ y_{31} \\ \vdots \\ y_{81} \\ y_{12} \\ y_{22} \\ \vdots \\ y_{78} \\ y_{88} \end{Bmatrix}$$

FIG. 9A $$L = \begin{bmatrix} L_{11} & & & 0 \\ & L_{22} & & \\ & & L_{33} & \\ 0 & & & L_{44} \end{bmatrix}$$

FIG. 9B $$\begin{matrix} L_{11} \\ L_{22} \\ L_{33} \\ L_{44} \end{matrix} = \begin{bmatrix} \begin{matrix} + & + & + & + \\ + & - & + & - \\ + & + & - & - \\ + & - & - & + \end{matrix} & & & 0 \\ & \begin{matrix} + & + & + & + \\ + & - & + & - \\ + & + & - & - \\ + & - & - & + \end{matrix} & & \\ & & \begin{matrix} + & + & + & + \\ + & - & + & - \\ + & + & - & - \\ + & - & - & + \end{matrix} & \\ 0 & & & \begin{matrix} + & + & + & + \\ + & - & + & - \\ + & + & - & - \\ + & - & - & + \end{matrix} \end{bmatrix}$$

FIG. 11

$$R_{11} = \begin{pmatrix} +0&0&0&0&0&0&0&0&0&0&0&0&0&0&0&0&0&0&0&0&0&0&0&0&0&0&0&0&0&0&0&0&0&0&0 \\ 0&0&0&0&0&0&0&0&0&0&0&0&0&0&0&0&0&0&0&0&0&0&0&0&0&0&0&0&0&0&0&0&0&0&0 \\ 0&0&0&0&+&0&0&0&0&0&0&0&0&0&0&0&0&0&0&0&0&0&0&0&0&0&0&0&0&0&0&0&0&0&0 \\ 0&0&0&0&0&0&0&0&0&0&0&0&0&0&0&0&0&0&0&0&0&0&0&0&0&0&0&0&0&0&0&0&0&0&0 \\ 0&0&0&0&0&0&0&+&0&0&0&0&0&0&0&0&0&0&0&0&0&0&0&0&0&0&0&0&0&0&0&0&0&0&0 \\ 0&0&0&0&0&0&0&0&0&0&0&0&0&0&0&0&0&0&0&0&0&0&0&0&0&0&0&0&0&0&0&0&0&0&0 \\ 0&0&0&0&0&0&0&0&0&0&+&0&0&0&0&0&0&0&0&0&0&0&0&0&0&0&0&0&0&0&0&0&0&0&0 \\ 0&0&0&0&0&0&0&0&0&0&0&0&0&0&0&0&0&0&0&0&0&0&0&0&0&0&0&0&0&0&0&0&0&0&0 \\ 0&0&0&0&0&0&0&0&0&0&0&0&0&+&0&0&0&0&0&0&0&0&0&0&0&0&0&0&0&0&0&0&0&0&0 \\ 0&0&0&0&0&0&0&0&0&0&0&0&0&0&0&0&0&0&0&0&0&0&0&0&0&0&0&0&0&0&0&0&0&0&0 \\ 0&0&0&0&0&0&0&0&0&0&0&0&0&0&0&0&+&0&0&0&0&0&0&0&0&0&0&0&0&0&0&0&0&0&0 \\ 0&0&0&0&0&0&0&0&0&0&0&0&0&0&0&0&0&0&0&0&0&0&0&0&0&0&0&0&0&0&0&0&0&0&0 \\ 0&0&0&0&0&0&0&0&0&0&0&0&0&0&0&0&0&0&0&+&0&0&0&0&0&0&0&0&0&0&0&0&0&0&0 \\ 0&0&0&0&0&0&0&0&0&0&0&0&0&0&0&0&0&0&0&0&0&0&0&0&0&0&0&0&0&0&0&0&0&0&0 \\ 0&0&0&0&0&0&0&0&0&0&0&0&0&0&0&0&0&0&0&0&0&0&0&+&0&0&0&0&0&0&0&0&0&0&0 \\ 0&0&0&0&0&0&0&0&0&0&0&0&0&0&0&0&0&0&0&0&0&0&0&0&0&0&0&0&0&0&0&0&0&0&0 \\ 0&0&0&0&0&0&0&0&0&0&0&0&0&+&0&0&0&0&0&0&0&0&0&0&0&0&0&0&0&0&0&0&0&0&0 \\ 0&0&0&0&0&0&0&0&0&0&0&0&0&0&0&0&0&0&0&0&0&0&0&0&0&0&0&0&0&0&0&0&0&0&0 \\ 0&0&0&0&0&0&0&0&0&0&0&0&0&0&0&0&0&0&0&0&0&0&0&0&0&0&0&0&+&0&0&0&0&0&0 \\ 0&0&0&0&0&0&0&0&0&0&0&0&0&0&0&0&0&0&0&0&0&0&0&0&0&0&0&0&0&0&0&0&0&0&0 \\ 0&0&0&0&0&0&0&0&+&0&0&0&0&0&0&0&0&0&0&0&0&0&0&0&0&0&0&0&0&0&0&0&0&0&0 \\ 0&0&0&0&0&0&0&0&0&0&0&0&0&0&0&0&0&0&0&0&0&0&0&0&0&0&0&0&0&0&0&0&0&0&0 \\ 0&0&0&0&0&0&0&0&0&0&0&0&0&0&0&0&0&0&0&0&0&0&0&0&0&0&0&+&0&0&0&0&0&0&0 \\ 0&0&0&0&0&0&0&0&0&0&0&0&0&0&0&0&0&0&0&0&0&0&0&0&0&0&0&0&0&0&0&0&0&0&0 \\ 0&0&0&0&0&+&0&0&0&0&0&0&0&0&0&0&0&0&0&0&0&0&0&0&0&0&0&0&0&0&0&0&0&0&0 \\ 0&0&0&0&0&0&0&0&0&0&0&0&0&0&0&0&0&0&0&0&0&0&0&0&0&0&0&0&0&0&0&0&0&0&0 \\ 0&0&0&0&0&0&0&0&0&0&0&0&0&0&0&0&0&0&0&+&0&0&0&0&0&0&0&0&0&0&0&0&0&0&0 \\ 0&0&0&0&0&0&0&0&0&0&0&0&0&0&0&0&0&0&0&0&0&0&0&0&0&0&0&0&0&0&0&0&0&0&0 \\ 0&+&0&0&0&0&0&0&0&0&0&0&0&0&0&0&0&0&0&0&0&0&0&0&0&0&0&0&0&0&0&0&0&0&0 \\ 0&0&0&0&0&0&0&0&0&0&0&0&0&0&0&0&0&0&0&0&0&0&0&0&0&0&0&0&0&0&0&0&0&0&0 \\ 0&0&0&0&0&0&0&0&0&0&0&0&0&0&+&0&0&0&0&0&0&0&0&0&0&0&0&0&0&0&0&0&0&0&0 \\ 0&0&0&0&0&0&0&0&0&0&0&0&0&0&0&0&0&0&0&0&0&0&0&0&0&0&0&0&0&0&0&0&0&0&0 \end{pmatrix}$$

FIG. 12

$$R_{12} = \begin{pmatrix}
0 0 0 0 0 0 0 0 0 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 0 + 0 0 0 \\
0 0 0 0 0 0 0 0 0 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 + 0 0 0 0 0 0 0 \\
0 0 0 0 0 0 0 0 0 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 + 0 0 0 0 0 0 0 0 0 0 0 \\
0 0 0 0 0 0 0 0 0 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 + 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 0 0 0 0 0 \\
0 0 0 0 0 0 0 0 0 0 0 0 0 0 + 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 0 0 0 0 0 \\
0 0 0 0 0 0 0 0 0 0 + 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 0 0 0 0 0 \\
0 0 0 0 0 0 + 0 0 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 0 0 0 0 0 \\
0 0 + 0 0 0 0 0 0 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 0 0 0 0 0 \\
+ 0 0 0 0 0 0 0 0 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 0 + 0 0 0 \\
0 0 0 0 0 0 0 0 0 0 0 0 0 0 0 0 0 0 0 0 0 0 0 0 0 0 0 0 0 0 0 0 0 0 \\
0 0 0 0 0 0 0 0 0 0 0 0 0 0 + 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 + 0 0 0 0 0 0 0 \\
0 0 0 0 0 0 0 0 0 0 0 0 0 0 0 0 0 0 0 0 0 0 0 0 0 0 0 0 0 0 0 0 0 0 \\
0 0 0 0 0 0 0 0 0 + 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 + 0 0 0 0 0 0 0 0 0 0 0 0 \\
0 0 0 0 0 0 0 0 0 0 0 0 0 0 0 0 0 0 0 0 0 0 0 0 0 0 0 0 0 0 0 0 0 0 \\
0 0 0 0 0 + 0 0 0 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 0 0 0 0 0 \\
0 0 0 0 0 0 0 0 0 0 0 0 0 0 0 0 + 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 0 0 0 0 0 \\
0 + 0 0 0 0 0 0 0 0 0 0 0 0 0 0 0 0 0 0 0 0 0 0 0 0 0 0 0 0 0 0 0 0
\end{pmatrix}$$

FIG. 13

$$R_{21} = \begin{pmatrix} \text{(matrix of 0s and + entries as shown)} \end{pmatrix}$$

FIG. 14

$$R_{22} = \begin{bmatrix}
0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 \\
0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0
\end{bmatrix}$$

$$TS_{11} = \begin{pmatrix} + + + + + + + 0 & 0 & 0 & 0 & 0 & 0 & 0 & 0 \\ 0 & 0 & 0 & 0 & 0 & 0 & 0 & 0 + + + + + + + \\ + + - - - - + + 0 & 0 & 0 & 0 & 0 & 0 & 0 & 0 \\ 0 & 0 & 0 & 0 & 0 & 0 & 0 & 0 + + - - - - + + \\ + + 0 & 0 & 0 & 0 - - 0 & 0 + + - - 0 & 0 \\ 0 & 0 - - + + 0 & 0 + + 0 & 0 & 0 & 0 - - \\ + + 0 & 0 & 0 & 0 - - 0 & 0 - - + + 0 & 0 \\ 0 & 0 + + - - 0 & 0 + + 0 & 0 & 0 & 0 - - \\ + - 0 & 0 & 0 & 0 + - + - 0 & 0 & 0 & 0 + - \\ 0 & 0 + - + - 0 & 0 & 0 & 0 + - + - 0 & 0 \\ + - 0 & 0 & 0 & 0 + - - + 0 & 0 & 0 & 0 - + \\ 0 & 0 + - + - 0 & 0 & 0 & 0 - + - + 0 & 0 \\ + - + - - + - + 0 & 0 & 0 & 0 & 0 & 0 & 0 & 0 \\ 0 & 0 & 0 & 0 & 0 & 0 & 0 & 0 + - + - - + - + \\ + - - + + - - + 0 & 0 & 0 & 0 & 0 & 0 & 0 & 0 \\ 0 & 0 & 0 & 0 & 0 & 0 & 0 & 0 + - - + + - - + \end{pmatrix}$$

FIG. 16A $$TS_{22} = TS_{33} = \begin{pmatrix}
0 & 0 & 0 & 0 & + & + & + & + & + & + & + & 0 & 0 & 0 & 0 \\
- & - & - & - & 0 & 0 & 0 & 0 & 0 & 0 & 0 & + & + & + & + \\
+ & + & + & + & 0 & 0 & 0 & 0 & 0 & 0 & 0 & + & + & + & + \\
0 & 0 & 0 & 0 & + & + & + & + & - & - & - & 0 & 0 & 0 & 0 \\
- & + & 0 & 0 & + & - & 0 & 0 & 0 & - & + & 0 & 0 & + & - \\
0 & 0 & + & - & 0 & 0 & + & - & + & - & 0 & 0 & + & - & 0 & 0 \\
0 & 0 & - & + & + & - & 0 & 0 & 0 & + & - & + & - & 0 & 0 \\
- & + & 0 & 0 & 0 & 0 & + & - & - & + & 0 & 0 & 0 & 0 & - & + \\
+ & - & 0 & 0 & 0 & 0 & + & - & - & + & 0 & 0 & 0 & 0 & + & - \\
0 & 0 & - & + & - & + & 0 & 0 & 0 & - & + & + & - & 0 & 0 \\
+ & - & 0 & 0 & + & - & 0 & 0 & 0 & - & + & 0 & 0 & - & + \\
0 & 0 & + & - & 0 & 0 & - & + & - & + & 0 & 0 & + & - & 0 & 0 \\
0 & 0 & 0 & 0 & + & + & - & - & + & + & - & - & 0 & 0 & 0 & 0 \\
- & - & + & + & 0 & 0 & 0 & 0 & 0 & 0 & 0 & + & + & - & - \\
+ & + & - & - & 0 & 0 & 0 & 0 & 0 & 0 & 0 & + & + & - & - \\
0 & 0 & 0 & 0 & + & + & - & - & - & - & + & + & 0 & 0 & 0 & 0
\end{pmatrix}$$

FIG. 16B $$TS_{44} = \begin{pmatrix}
+ & + & 0 & 0 & 0 & 0 & 0 & 0 & 0 & + & + & 0 & 0 & 0 & 0 \\
0 & 0 & - & + & + & 0 & 0 & - & + & 0 & 0 & 0 & 0 & + & + \\
- & + & + & 0 & 0 & 0 & + & + & 0 & 0 & + & + & 0 & 0 \\
0 & 0 & 0 & 0 & + & - & - & - & 0 & 0 & + & - & 0 & 0 & - & + \\
0 & 0 & - & + & 0 & 0 & 0 & 0 & 0 & 0 & 0 & 0 & 0 & - & - \\
+ & + & 0 & 0 & 0 & 0 & - & + & 0 & 0 & - & - & - & + & 0 & 0 \\
- & + & 0 & 0 & - & + & 0 & 0 & 0 & 0 & 0 & - & - & - & + \\
0 & 0 & + & + & 0 & 0 & - & - & - & - & + & 0 & 0 & 0 & 0 \\
0 & 0 & 0 & 0 & + & + & 0 & 0 & + & - & 0 & 0 & 0 & 0 & 0 & 0 \\
+ & + & 0 & 0 & 0 & 0 & + & - & 0 & 0 & - & - & + & - & 0 & 0 \\
0 & 0 & + & + & 0 & 0 & + & + & - & - & + & - & 0 & 0 & 0 & 0 \\
- & + & 0 & 0 & + & - & 0 & 0 & 0 & 0 & 0 & - & - & + & - \\
0 & 0 & 0 & 0 & 0 & 0 & - & + & 0 & 0 & 0 & 0 & + & - & 0 & 0 \\
0 & 0 & + & - & + & + & 0 & 0 & - & + & 0 & 0 & 0 & 0 & - & - \\
0 & 0 & 0 & 0 & - & + & - & - & 0 & 0 & + & - & 0 & 0 & + & - \\
- & + & - & - & 0 & 0 & 0 & 0 & - & - & 0 & 0 & + & + & 0 & 0
\end{pmatrix}$$

FIG. 17A

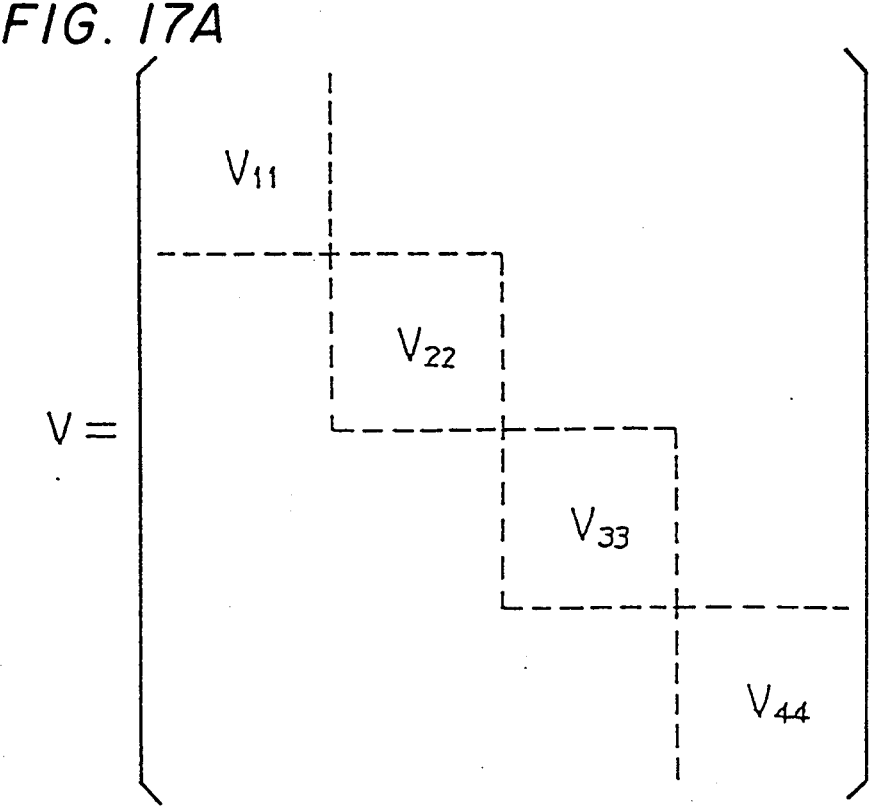

FIG. 17B $$V_{11} = \begin{pmatrix} + & + & 0 & 0 & & & & & & & & \\ + & - & 0 & 0 & & & & & & & & \\ 0 & 0 & + & + & & & & & & & & \\ 0 & 0 & + & - & & & & & & & & \\ & & & & + & 0 & i & i & & & & \\ & & & & + & 0 & j & j & & & & \\ & & & & 0 & - & i & j & & & & \\ & & & & 0 & + & i & j & & & & \\ & & & & & & & & k & k & l & l \\ & & & & & & & & n & n & k & k \\ & & & & & & & & k & m & l & n \\ & & & & & & & & n & l & k & m \\ & & & & & & & & & & & & k & k & l & l \\ & & & & & & & & & & & & n & n & k & k \\ & & & & & & & & & & & & k & m & l & n \\ & & & & & & & & & & & & n & l & k & m \end{pmatrix}$$

FIG. 18A $$V_{22} \atop V_{33} = \begin{Bmatrix} \begin{matrix} a & c & b & h \\ f & a & d & g \\ g & h & a & b \\ d & b & g & a \end{matrix} & & & \\ & \begin{matrix} a & h & c & b \\ f & g & a & d \\ g & b & h & a \\ d & a & b & g \end{matrix} & & \\ & & \begin{matrix} a & d & c & b \\ f & c & a & d \\ g & f & h & a \\ h & a & f & c \end{matrix} & \\ & & & \begin{matrix} a & c & b & h \\ f & a & d & g \\ g & h & a & b \\ d & b & g & a \end{matrix} \end{Bmatrix}$$

FIG. 18B $$V_{44} = \begin{Bmatrix} \begin{matrix} + & i & k & n \\ + & j & \ell & k \\ + & j & n & m \\ + & i & m & \ell \end{matrix} & & & \\ & \begin{matrix} + & i & k & \ell \\ - & i & n & k \\ - & i & \ell & m \\ - & j & k & \ell \end{matrix} & & \\ & & \begin{matrix} + & i & k & \ell \\ - & i & n & k \\ + & j & n & k \\ + & i & m & n \end{matrix} & \\ & & & \begin{matrix} + & j & k & \ell \\ - & j & n & k \\ + & i & n & k \\ - & i & k & \ell \end{matrix} \end{Bmatrix}$$

FIG. 19

$$W = \begin{bmatrix} W_{11} & | & W_{12} \\ \text{-----} & + & \text{-----} \\ W_{21} & | & W_{22} \end{bmatrix}$$

FIG. 20

$$W_{11} = \begin{pmatrix}
+ & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 \\
0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 \\
0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 \\
0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0
\end{pmatrix}$$

FIG. 21

$$W_{12} = \begin{pmatrix}
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & \bar{0} & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
+ & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 \\
0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 \\
0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 \\
\end{pmatrix}$$

FIG. 22

$$W_{21} = \begin{pmatrix}
0 + 0 0 0 0 0 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 + 0 0 0 \\
0 0 0 0 0 0 0 0 0 0 0 0 + 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 + 0 0 \\
0 0 0 + 0 0 0 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 0 + 0 \\
0 0 0 0 0 0 0 0 0 0 0 0 0 0 0 + 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 0 0 + \\
0 0 0 0 0 0 0 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 0 0 0 \\
0 0 0 0 0 0 0 0 + 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 + 0 0 0 0 0 0 0 0 0 \\
0 0 0 0 0 0 + 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 + 0 0 0 0 0 0 0 0 0 0 0 \\
0 0 0 0 0 0 0 0 0 0 0 0 + 0 0 0 0 0 0 0 0 0 0 0 0 0 0 0 0 0 0 0 \\
0 0 0 0 0 0 0 0 0 0 0 0 0 0 0 0 0 0 0 + 0 0 0 0 0 0 0 0 0 0 0 0 \\
0 0 0 0 0 + 0 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 + 0 0 0 0 0 \\
0 0 0 0 0 0 0 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 0 0 0 \\
0 0 0 0 0 0 0 0 0 0 0 0 0 0 0 0 0 0 0 0 0 0 0 0 0 0 0 0 0 0 0 0
\end{pmatrix}$$

FIG. 23

$$W_{22}=\begin{pmatrix} 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\ 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 \\ 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 \\ 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 \\ 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\ 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 \\ 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 \\ 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 \end{pmatrix}$$

DISCRETE COSINE TRANSFORM APPARATUS AND INVERSE DISCRETE COSINE TRANSFORM APPARATUS

BACKGROUND OF THE INVENTION

1. Field of the Invention

The present invention relates to a discrete cosine transform apparatus and an inverse discrete cosine transform apparatus for use in digital image processing or the like.

2. Description of the Prior Art

There are known various discrete orthogonal transforms which are suitable for digital image processing. Of such discrete orthogonal transforms, a discrete cosine transform (DCT) is suitable for compressing band bandwidth and a processing system thereof is relatively simple.

In the DCT, in the case of N-degree, by utilizing a matrix [N] formed of elements of $1/\sqrt{2}$ on first row and elements under second row expressed as $$\cos\{(2x+1)k\pi/2N\}$$

$$(x=0, 1 \ldots N-1; k=1 \ldots N-1)$$

transform and inverse transform (IDCT) are defined. In the case of two dimension, the following equations are established:

$$[Y]=[N][X]^t[N]$$

$$[X]={}^t[N][Y][N]$$

Although a coefficient $\frac{1}{2}^{N+1}$ is multiplied to the equation (1) when the scale of matrix is $2^N$ rows and $2^N$ columns, it is equivalent to the data shift of $N+1$ bits and therefore such coefficient need not be described.

The matrix data shown in the equations (1),(2) are multiplied with each other by using a multiplying apparatus formed of an inner product calculating circuit and a rearranging circuit shown in FIG. 1. In FIG. 1, reference numerals 10 and 20 depict inner product calculating circuits, each of which is formed of four-degree arrangement corresponding to a matrix of 4 rows and 4 columns. The inner product circuits 10 and 20 are connected to each other by means of a rearranging circuit 30.

Data matrix [X] shown in equation (3) is input from a terminal IN and an inner product calculation of coefficient matrix [A] shown in equation (4) is carried out by one inner product calculating circuit 10.

$$[X] = \begin{bmatrix} x_{11} & x_{12} & x_{13} & x_{14} \\ x_{21} & x_{22} & x_{23} & x_{24} \\ x_{31} & x_{32} & x_{33} & x_{34} \\ x_{41} & x_{42} & x_{43} & x_{44} \end{bmatrix} \quad (3)$$

$$[A] = \begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix} \quad (4)$$

In the inner product calculation circuit 10, three unit delay elements $11_1$, $11_2$, $11_3$ are connected in series in the inverse order and four latches $12_1$, $12_2$, $12_3$ and $12_4$ are respectively connected to output end, two junctions and input end of the three unit delay elements $11_1$, $11_2$ and $11_3$. Coefficient ROMs (read only memories) $14_1$ to $14_4$ are respectively connected to multipliers $13_1$ to $13_4$ that are connected to the latches $12_1$, to $12_4$. Outputs of the respective multipliers $13_1$ to $13_4$ are connected to an adder 15. Thus, the inner product calculation circuit 10 is arranged as a finite impulse response (FIR) type transversal filter.

Similarly, the inner product calculating circuit 20 is arranged as an FIR type transversal filter. Reference numerals in the second digits of corresponding elements of the inner product calculating circuit 20 are replaced with [2] and the corresponding elements are therefore need not be described in detail. A coefficient $b_{iL}$ stored in ROMs $24_1$ to $24_4$ is different from a coefficient $a_{ij}$ of the ROMs $14_1$ to $14_4$.

The rearranging circuit 30 comprises a pair of RAMs 31, 32 and change-over switches 33 and 34 of input and output sides. The two switches 33 and 34 are switched in a ganged relation so that data is read out from the other RAM during data is written in one RAM. The capacity of the RAMs 31, 32 are selected to be 16 words in response to the matrix of 4 rows and 4 columns.

A matrix data multiplication according to the example of the prior art shown in FIG. 1 will be described with reference to FIGS. 2A to 2J.

From the input terminal IN, there are supplied data a of input matrix [X] of 16-word unit shown in FIG. 2A in the sequential order of first column ($x_{11}$, $x_{21}$, $x_{31}$, $x_{41}$) to fourth column ($x_{14}$, $x_{24}$, $x_{34}$, $x_{44}$).

At a timing point $t_1$ where a time 3T of 3 cycles is passed from an input start timing point $t_0$ of the unit data, the first column data $x_{11}$, $x_{21}$ and $x_{31}$ exist on the respective output ends of the unit delay elements $11_1$, $11_2$ and $11_3$ and the fourth data $x_{41}$ exists in the input end of the delay element $11_3$.

Under this condition, a common enable pulse is supplied to the respective latches. The four data $x_{11}$, $x_{21}$, $x_{31}$, and $x_{41}$ of the first column are latched in the four latches $12_1$, $12_2$, $12_3$ and $12_4$ and held therein over the period of 4T from a timing point $t_2$ which is behind the input start timing point $t_0$ by 4T time.

Coefficients $a_{i1}$, $a_{i2}$, $a_{i3}$ and $a_{i4}$ (i=1, 2, 3, 4) of respective columns of the coefficient matrix [A] are stored in the ROMs $14_1$, $14_2$, $14_3$ and $14_4$. As shown in FIGS. 2C, 2E, 2G and 2J, these coefficients are sequentially supplied to the corresponding multipliers $13_1$, $13_2$, $13_3$ and $13_4$ at every cycle after the timing point t2, thereby being multiplied respectively with the data $x_{i1}$ (i=1, 2, 3, 4) of the first column held in the corresponding latches $12_1$, $12_2$, $12_3$ and $12_4$.

That is, at first, second, third and fourth cycles after the timing point t2, coefficients $a_{1j}$, $a_{2j}$, $a_{3j}$ and $a_{4j}$ (j=1, 2, 3, 4) of first, second, third and fourth rows of the coefficient matrix are multiplied with the first column data $x_{11}$, $x_{21}$, $x_{31}$, and $x_{41}$.

The adder 15 adds outputs of the respective multipliers $13_1$ to $13_4$ and produce first column data $u_{11}$, $u_{21}$, $u_{31}$ and $u_{41}$ of matrix [U] of product shown in the following equation (5) at four cycles after the timing point t2.

$$[U]=[A][X] \quad (5)$$

On the other hand, as shown in FIG. 2A, the input of second column data $x_{12}$, $x_{22}$, $x_{32}$ and $x_{42}$ of matrix [X] is started at the timing point $t_2$. Similarly as described before, at a timing point $t_3$ which is behind of the timing point $t_2$ by 4T time, the second column data $x_{12}$, $x_{22}$, $x_{32}$ and $x_{42}$ are respectively latched in the latches $12_1$, $12_2$, $12_3$ and $12_4$. At every cycle after the timing point $t_3$, coefficients $a_{i1}$, $a_{i2}$, $a_{ai3}$ and $a_{i4}$ ($i=1, 2, 3, 4$) of respective columns of the matrix [A] are sequentially output from the ROMs $14_1$, $14_2$, $14_3$ and $14_4$ similarly as described above.

Similarly as described above, at four cycles after the timing point $t_3$, second column data $u_{12}$, $u_{22}$, $u_{32}$ and $u_{42}$ of product matrix [U] shown in the equation (5) are obtained.

Similarly as described above, at four cycles after the timing point $t_4$, third column data $u_{13}$ to $u_{43}$ of product matrix [U] are obtained and at four cycles after the next timing point $t_5$, fourth column data $u_{14}$ to $u_{44}$ of product matrix [U] are obtained.

Data of 16 words arranged the order of column of the matrix [U] thus obtained are alternately written in the RAMs 31, 32 of the rearranging circuit 30. By changing the write address and the read address, data of the matrix [U] alternately read out from the RAMs 31, 32 in the order of rows are supplied to the second inner product calculating circuit 20, in which they are multiplied with the second coefficient matrix [B] in exactly the same way as the above method. Therefore, data of product matrix [Y] expressed by the following equation (6) is developed at an output terminal OUT.

$$[Y]=\{U\}B]=[A][X][B] \qquad (6)$$

When the matrix is formed of 8 rows and 8 columns, constant matrix [N] of the equation (1) is expressed by the following equation (7):

$$[N] = \begin{bmatrix} i & i & i & i & i & i & i & i \\ a & b & c & d & h & g & f & e \\ k & l & n & m & m & n & l & k \\ b & h & e & g & c & a & d & f \\ i & j & j & i & i & j & j & i \\ c & e & d & b & f & j & h & a & g \\ l & m & k & n & n & k & m & l \\ d & g & b & e & a & f & c & h \end{bmatrix} \qquad (7)$$

As shown in FIG. 3, each of elements a to n represents cosine of a predetermined angle where angle $\pi/16$ is taken as the unit.

As clear from the equation (1) which defines DCT and IDCT, element $Y_{ij}$ of matrix [Y] is expressed by linear expression of element $x_{ij}$ of matrix [X].

Accordingly, as shown in FIG. 4, a relation expressed by the following equation (8) is established between [Xc] in which elements $x_{11}$ to $x_{88}$ of 8 rows and 8 columns are input in the order of columns to form 64-degree vector and [Yc] where elements $y_{11}$ to $y_{88}$ of 8 rows and 8 columns are input in the order of columns to form 64-degree vector.

$$[Yc]=[M][Xc] \qquad (8)$$

where [M] is the constant matrix of 64 rows and 64 columns.

When the conventional matrix data multiplying apparatus performs the calculation shown in equation (8), such data are simultaneously calculated by using 64-degree inner product calculating circuit. Consequently, the circuit scale is increased considerably and the circuit arrangement becomes complicated. Also, the number of calculations is increased and hence the calculation speed is limited.

OBJECTS AND SUMMARY OF THE INVENTION

Therefore, it is an object of the present invention to provide the improved matrix data multiplying apparatus in which the aforesaid shortcomings and disadvantages of the prior art can be eliminated.

More specifically, it is an object of the present invention to provide a matrix data multiplying apparatus in which the circuit scale can be reduced.

It is another object of the present invention to provide a matrix data multiplying apparatus in which the circuit arrangement can be simplified.

It is still another object of the present invention to provide a matrix data multiplying apparatus in which the number of calculation can be reduced and high speed calculation can be carried out.

According to a first aspect of the present invention, there is provided a discrete cosine transform apparatus having an inner product calculating circuit for calculating an inner product of a matrix and a rearranging circuit for rearranging a data component of a matrix in a predetermined order. This discrete cosine transform apparatus comprises a four-degree first inner product calculating circuit having coefficients of +1 and −1, an 8-degree second inner product calculating circuit having coefficients of 0, +1 and −1 and a third inner product calculating circuit including a memory in which data component of constant matrix is stored, wherein input data of 8 rows and 8 columns is supplied through a first rearranging circuit to the first inner product calculating circuit, an output of the first inner product calculating circuit is supplied through a second rearranging circuit to the second inner product calculating circuit, an output of the second inner product calculating circuit is directly supplied to the third inner product calculating circuit, and an output of the third inner product calculating circuit is delivered through a third rearranging circuit.

According to a second aspect of the present invention, there is provided an inverse discrete cosine transfor apparatus having an inner product calculating circuit for calculating an inner product of a matrix and a rearranging circuit for rearranging a data component of a matrix in a predetermined order. This inverse discrete cosine transform apparatus comprises first inner product calculating circuits having a memory in which a data component of constant matrix is stored, an 8-degree second inner product calculating circuit having coefficients of 0, +1 and −1 and a 4-degree third inner product calculating circuit having coefficients of +1 and −1, wherein input data of 8 rows and 8 columns is supplied through a first rearranging circuit to the first inner product calculating circuit. An output of the first inner product calculating circuit is directly supplied to the second inner product calculating circuit, an output of the second inner product calculating circuit is supplied through a second rearranging circuit to the third inner product calculating circuit, and an output of the third inner product calculating circuit is delivered through a third rearranging circuit.

According to a third aspect of the present invention, there is provided a discrete cosine transfor apparatus having an inner product calculating circuit for calculating an inner product of a matrix and a rearranging circuit for rearranging a data component of a matrix in a predetermined order. This discrete cosine transform apparatus comprises a parallel circuit for converting matrix data serially supplied thereto into parallel data, 4-degree first inner product calculating circuit having coefficients of +1 and −1, 8-degree second inner product calculating circuits having coefficients of 0, +1 and −1, and a third inner product calculating circuit having a memory in which a data component of constant matrix is stored, wherein the first, second and third inner product calculating circuits of a predetermined number are provided in parallel to one another, input data of 8 rows and 8 columns is supplied through a first rearranging circuit to the parallel circuit, data of parallel data output from the parallel circuit are supplied to the first inner product calculating circuit of the predetermined number, outputs of the first inner product calculating circuits are directly supplied to the corresponding inner product calculating circuits of the second inner product calculating circuits of the predetermined number, outputs of the second inner product calculating circuits are directly supplied to the corresponding third inner product calculating circuits of the third inner product calculating circuits of the predetermined number, and outputs of the third inner product calculating circuits of the predetermined number are converted into serial data and then delivered through a third rearranging circuit.

According to a fourth aspect of the present invention, there is provided an inverse discrete cosine transfor apparatus having an inner product calculating circuit for calculating an inner product of a matrix and a rearranging circuit for rearranging a data component of a matrix in a predetermined order. This inverse discrete cosine transform apparatus comprises a parallel circuit for converting matrix data serially supplied thereto into parallel data first inner product calculating circuits each having a memory in which a data component of constant matrix is stored, an 8-degree fifth inner product calculating circuits each having coefficients of 0, +1 and −1 and 4-degree third inner product calculating circuits each having coefficients of +1 and −1, wherein the first, second and third inner product calculating circuits of the predetermined number are provided in parallel to one another, input data of 8 rows and 8 columns is supplied through a first rearranging circuit to the parallel circuit, data of parallel data output from the parallel circuit are supplied to the first inner product calculating circuit of the predetermined number, outputs of the first inner product calculating circuits are directly supplied to the corresponding second inner product calculating circuits of the second inner product calculating circuits of the predetermined number, outputs of the second inner product calculating circuits are directly supplied to the corresponding third inner product calculating circuits of the third inner product calculating circuits of the predetermined number, and outputs of the third inner product calculating circuits of the predetermined number are converted into serial data and then delivered through a third rearranging circuit.

The above and other objects, features, and advantages of the present invention will become apparent from the following detailed description of illustrative embodiments thereof to be read in conjunction with the accompanying drawings, in which like reference numerals are used to identify the same or similar parts in the several views.

BRIEF DESCRIPTION OF THE DRAWINGS

FIG. 1 is a block diagram showing a circuit arrangement of a conventional matrix data multiplying apparatus;

FIG. 4 is a diagram used to explain the present invention;

FIGS. 8 through 23 are respectively diagrams showing matrixes and to which references will be made in explaining operation of the main portion of the present invention;

DETAILED DESCRIPTION OF THE PREFERRED EMBODIMENTS

Figure 2:
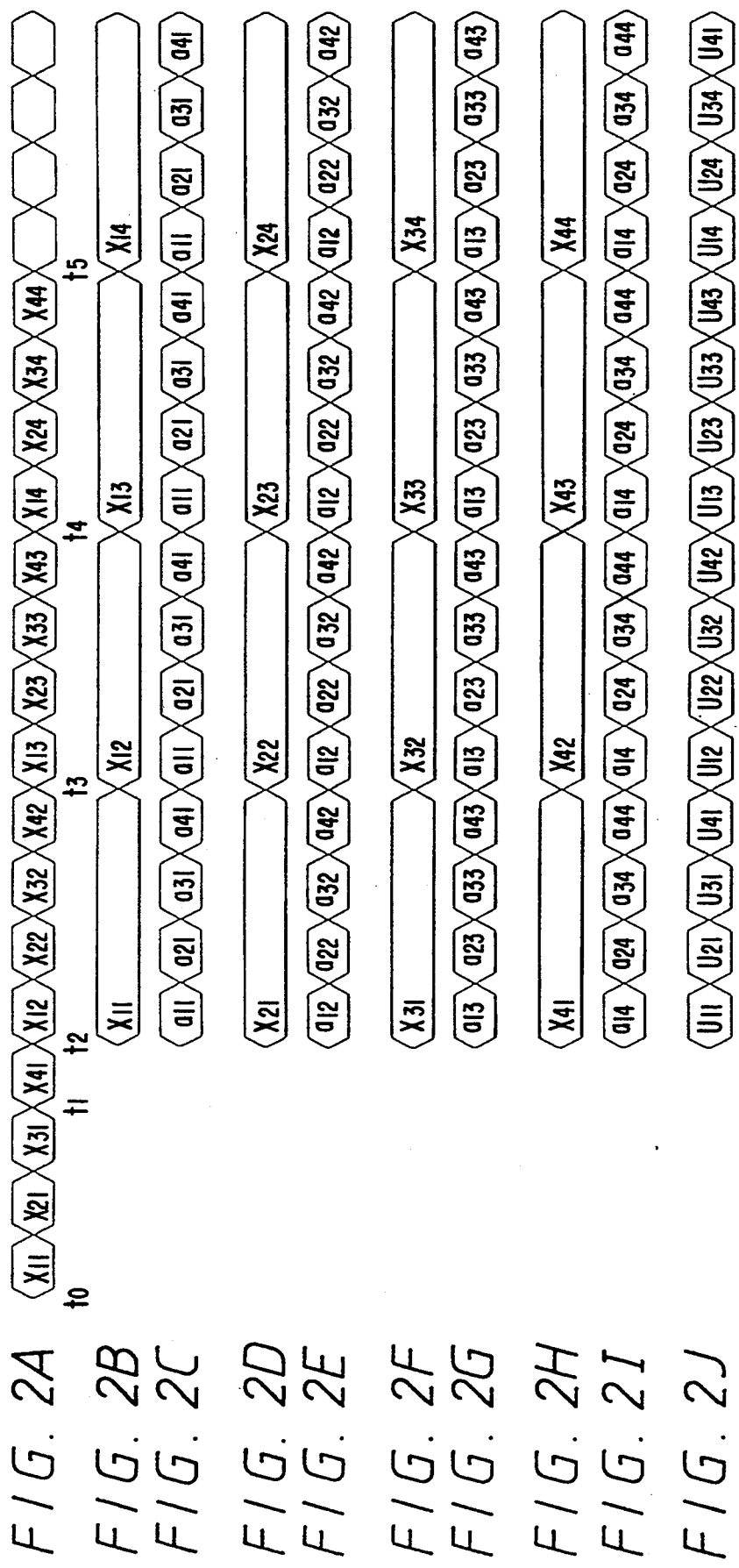
FIGS. 2A to 2J are respectively timing charts used to explain operation of the example of the conventional apparatus shown in FIG. 1.
Figure 3:
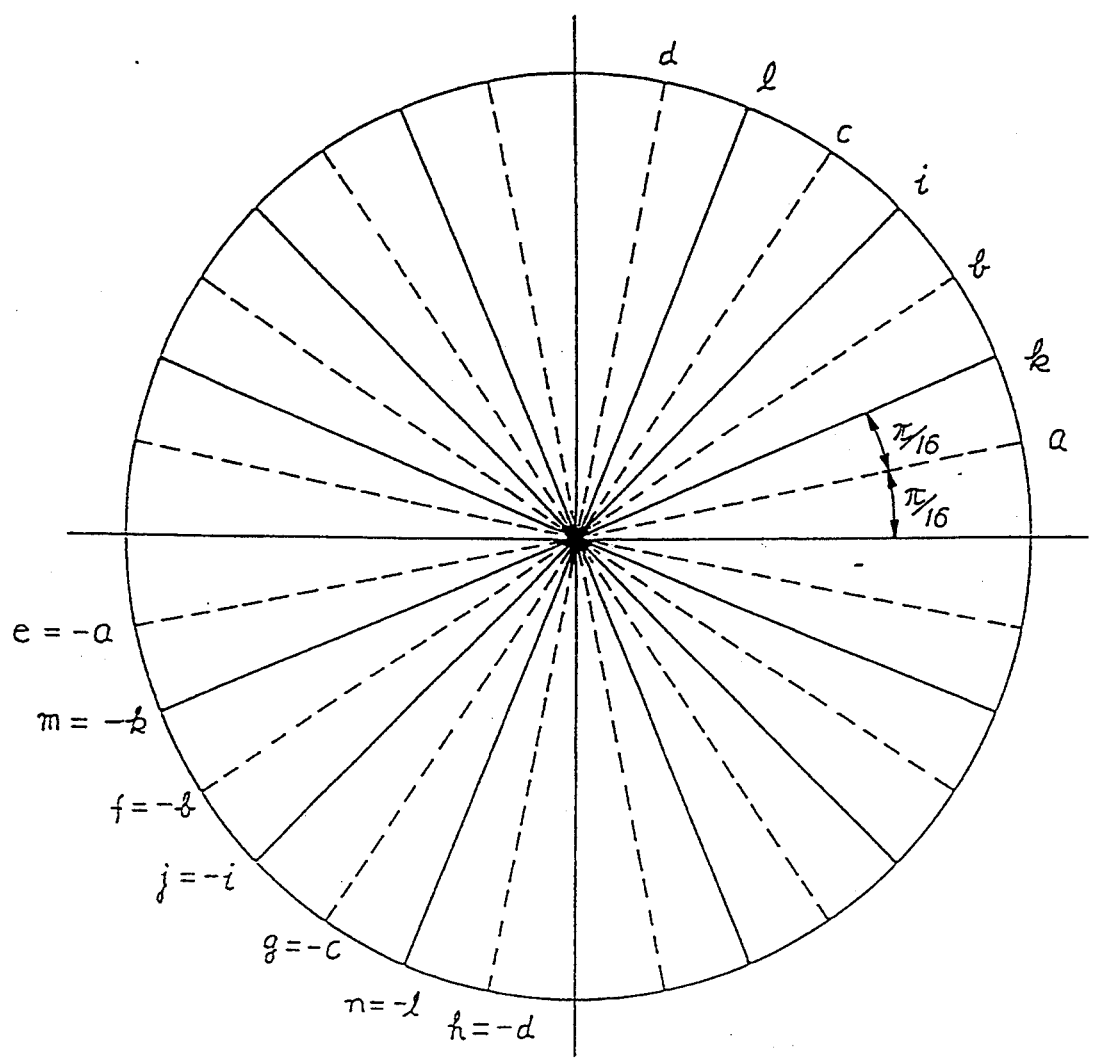
FIG. 3 is a diagram used to explain the present invention.
Figure 5:
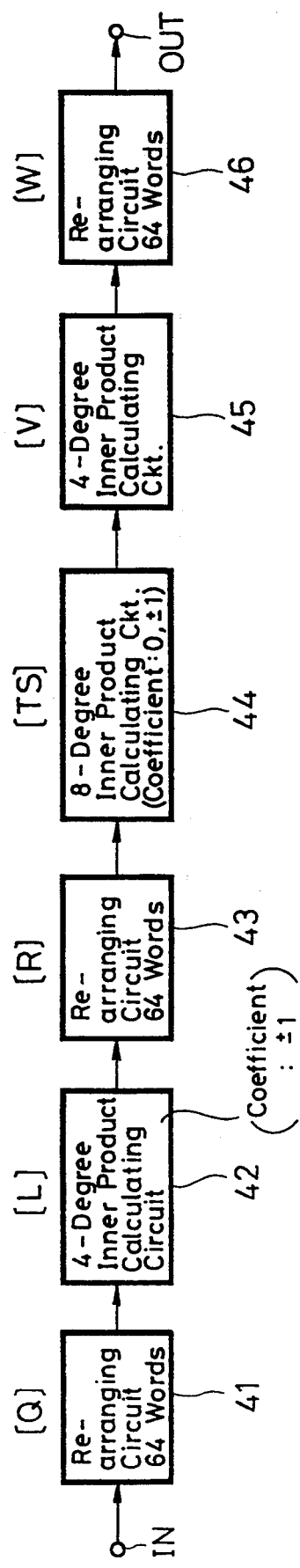
FIG. 5 is a block diagram showing a circuit arrangement of a discrete cosine transform apparatus according to an embodiment of the present invention.

A matrix data multiplying apparatus according to an embodiment of the present invention will hereinafter be described with reference to FIGS. 5 to 23. FIG. 5 shows in block form a circuit arrangement of the embodiment of the present invention, and FIGS. 6 and 7 show circuit arrangement of a main portion thereof.

As shown in FIG. 5, data of 8 rows and 8 columns are sequentially input in the order of columns from an input terminal IN in the form of vector shown in FIG. 4 and then supplied through a first rearranging circuit 41 to a first four-degree inner product calculating circuit 42. An output of the inner product calculating circuit 42 is supplied through a second rearranging circuit 43 of 64 words to a second 8-degree inner product calculating circuit 44. An output of the inner product calculating circuit 44 is supplied to a third four-degree inner product calculating circuit 45. An output of the inner product calculating circuit 45 is supplied to a third rearranging circuit 46 of 64 words to an output terminal OUT>

As will be described later, coefficients of the first inner product calculating circuit 42 are $+1$ and $-1$ and coefficients of the second inner product calculating circuit 44 are 0, $+1$ and $-1$. The coefficient of the inner product calculating circuit 45 becomes a value peculiar to the DCT.

Figure 6:
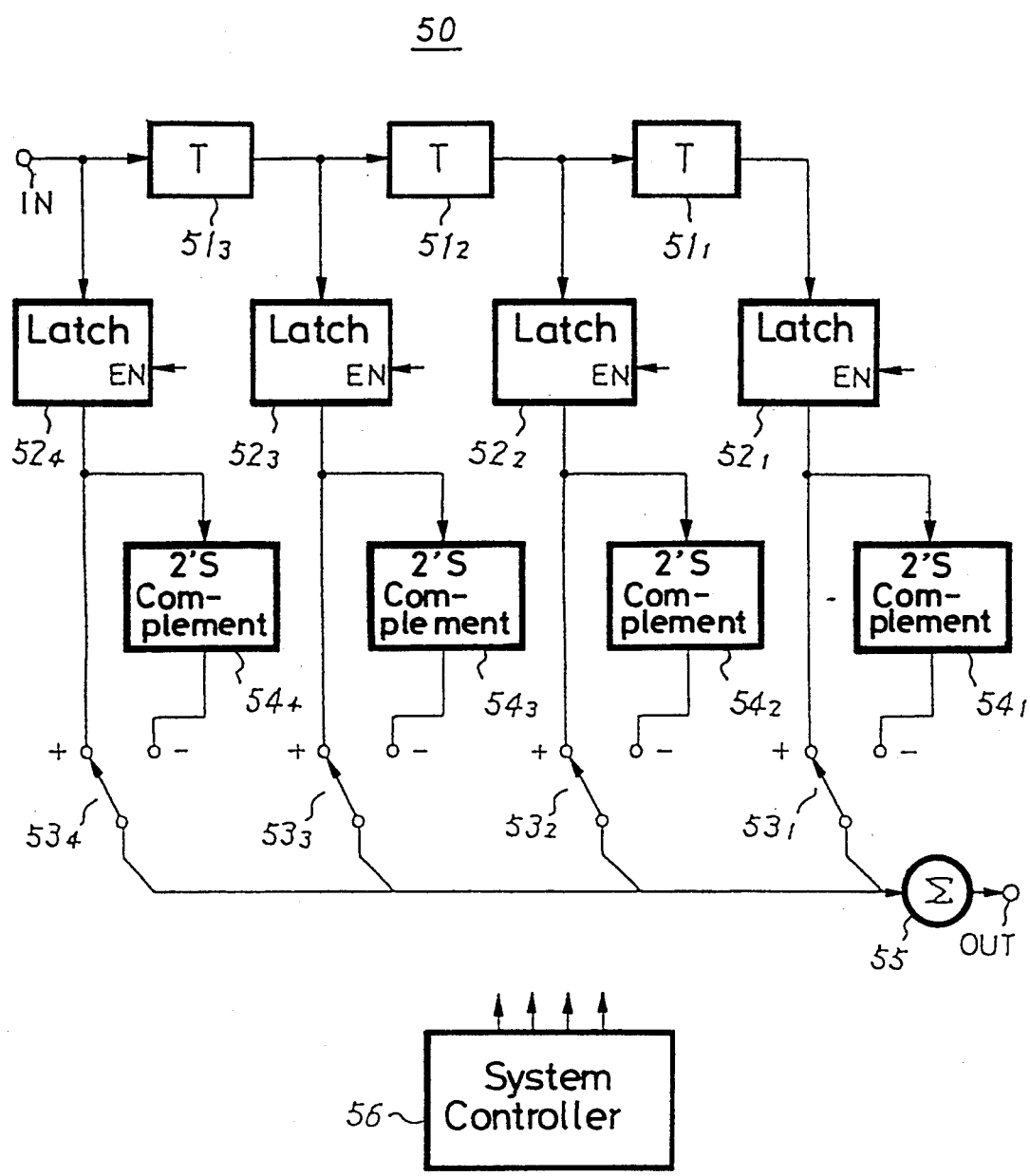
FIG. 6 is a block diagram showing a circuit arrangement of a main portion of the apparatus according to the present invention.
Figure 7:
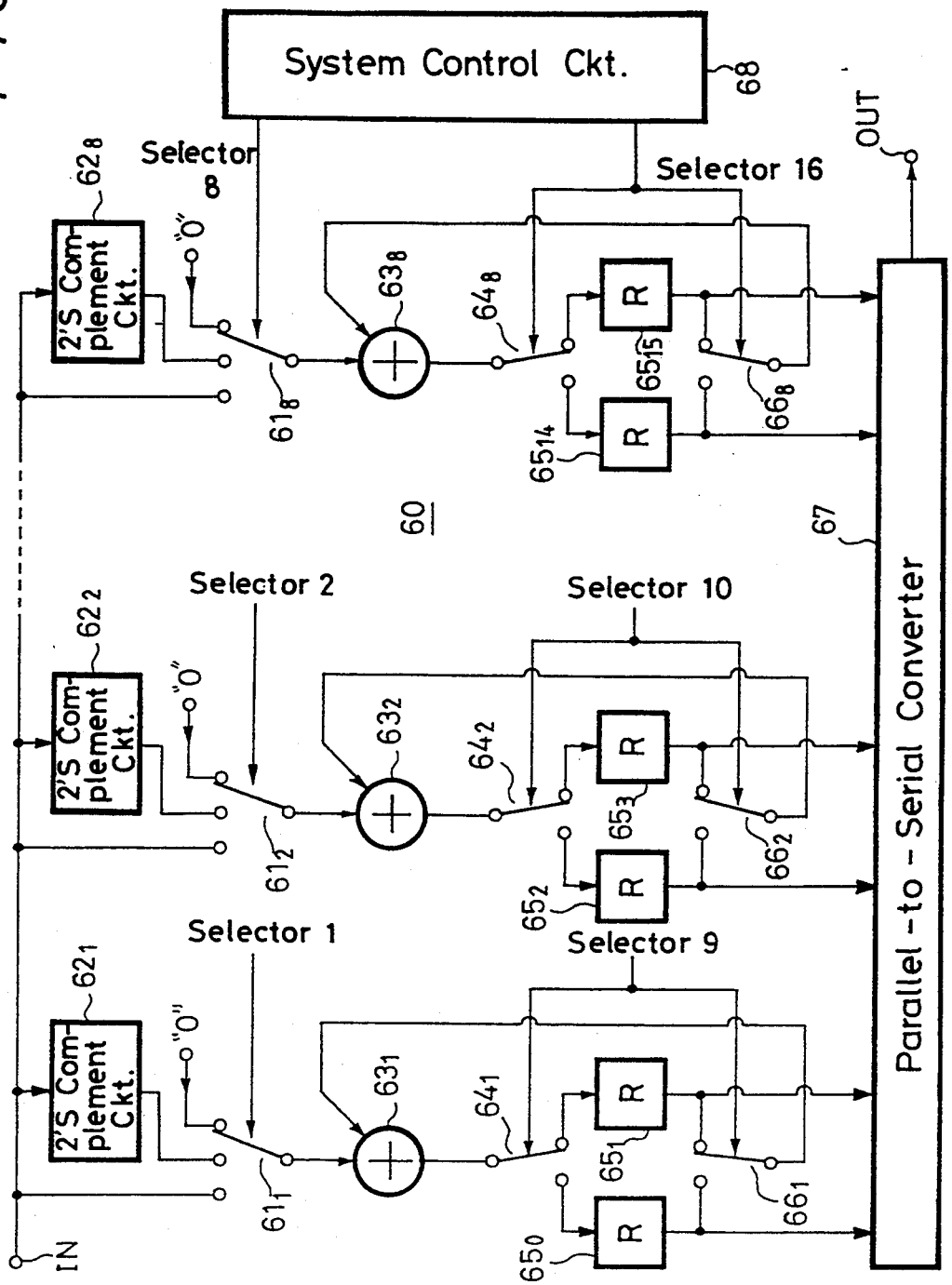
FIG. 7 is a block diagram showing a circuit arrangement of a main portion of the apparatus according to the present invention.
Figure 10:
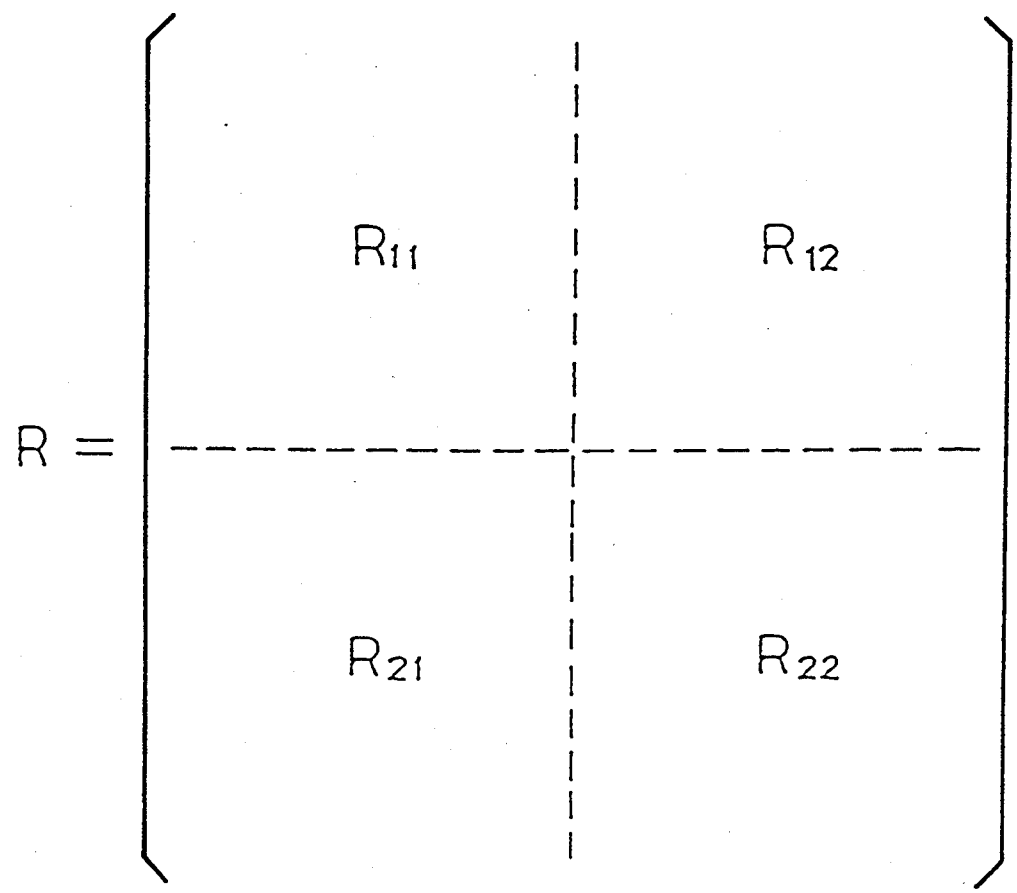

In FIG. 6, reference numeral 50 depicts a four-degree inner product calculating circuit which is equivalent to the inner product calculating circuit 42 shown in FIG. 5. Three unit delay elements $51_1$, $51_2$, $51_3$ are connected in series in the reverse order and four latches $52_1$, $52_2$, $52_3$ and $52_4$ are respectively connected to output end, two junctions and input end of the above unit delay elements $51_1$ to $51_3$. Outputs of the latches $52_1$ to $52_4$ are respectively connected to plus-side contacts of switches $53_1$ to $53_4$ and further supplied through 2's complement circuits $54_1$ to $54_4$ to minus-side contacts of the switches $53_1$ to $53_4$, respectively. Outputs of the switches $53_1$ to $53_4$ are supplied to an adder 55.

The switches $53_1$ to $53_4$ constitute multipliers having coefficients $+1$ and $-1$ together with the respective 2's complement circuits $54_1$ to $54_4$ and independently switched under the control of a system control circuit 56.

The 2's complement circuits $54_1$ to $54_4$ are each formed of NAND circuits and adding circuits as is well-known.

In FIG. 7, reference numeral 60 depicts an 8-degree inner product calculating circuit that is equivalent to the inner product calculating circuit 44 shown in FIG. 5. An input IN is supplied to first contacts of eight change-over switches $61_1$ to $61_8$ and also supplied through eight 2's complement circuits $62_1$ to $62_8$ to second contacts of the switches $61_1$ to $61_8$. Outputs of the switches $61_1$ to $61_8$ are respectively supplied to adders $63_1$ to $63_8$.

Outputs of these adders $63_1$ to $63_8$ are respectively supplied through switches $64_1$ to $64_8$ to 16 latches $65_0$ to $65_{15}$. Outputs of these pair of latches $65_0$, $65_1$; $65_2$, $65_3$ . . . $65_{14}$, $65_{15}$ are respectively supplied to pairs of contacts of eight change-over switches $66_1$, $66_2$, . . . $66_8$. Outputs of the switches $66_1$ to $66_8$ are respectively supplied to the adders $63_1$ to $63_8$.

Outputs of the latches $65_0$ to $65_{15}$ are supplied to a parallel-to-serial converter 67 and an output terminal OUT is led out from the parallel-to-serial converter 67.

The change-over switches $61_1$ to $61_8$ constitute multipliers having coefficients $+1$ and $-1$ together with the 2's complement circuits $62_1$ to $62_8$ and independently switched together with the switches $64_1$ to $64_8$ and $66_1$ to $66_8$ under the control of a system control circuit 68.

Operation of the embodiment shown in FIG. 5 will be described with reference to FIGS. 8 to 15.

In the embodiment shown in FIG. 5, the constant matrix [M] of 64 rows and 64 columns for DCT is resolved into 6 matrices shown in the following equation (9):

$$[M]=[W][V][TS][R][L][Q]/8 \qquad (9)$$

The matrices [Q], [R] and [W] correspond to the first, second and third rearranging circuits 41, 43 and 46, respectively. The matrices [L], [TS] and [V] correspond to the first, second and third inner product calculating circuits 42, 44 and 45, respectively. Each of the matrices [Q] to [W] is formed of 64 rows and 64 columns and a sparse matrix having a number of zero elements as shown in FIGS. 8 to 15.

In FIGS. 8 to 15, $+$ and $-$ respectively designate $+1$ and 1 and this is also true in the figures of drawings showing other matrixes which will be described later on.

Figures 8A, 8B, 8C:
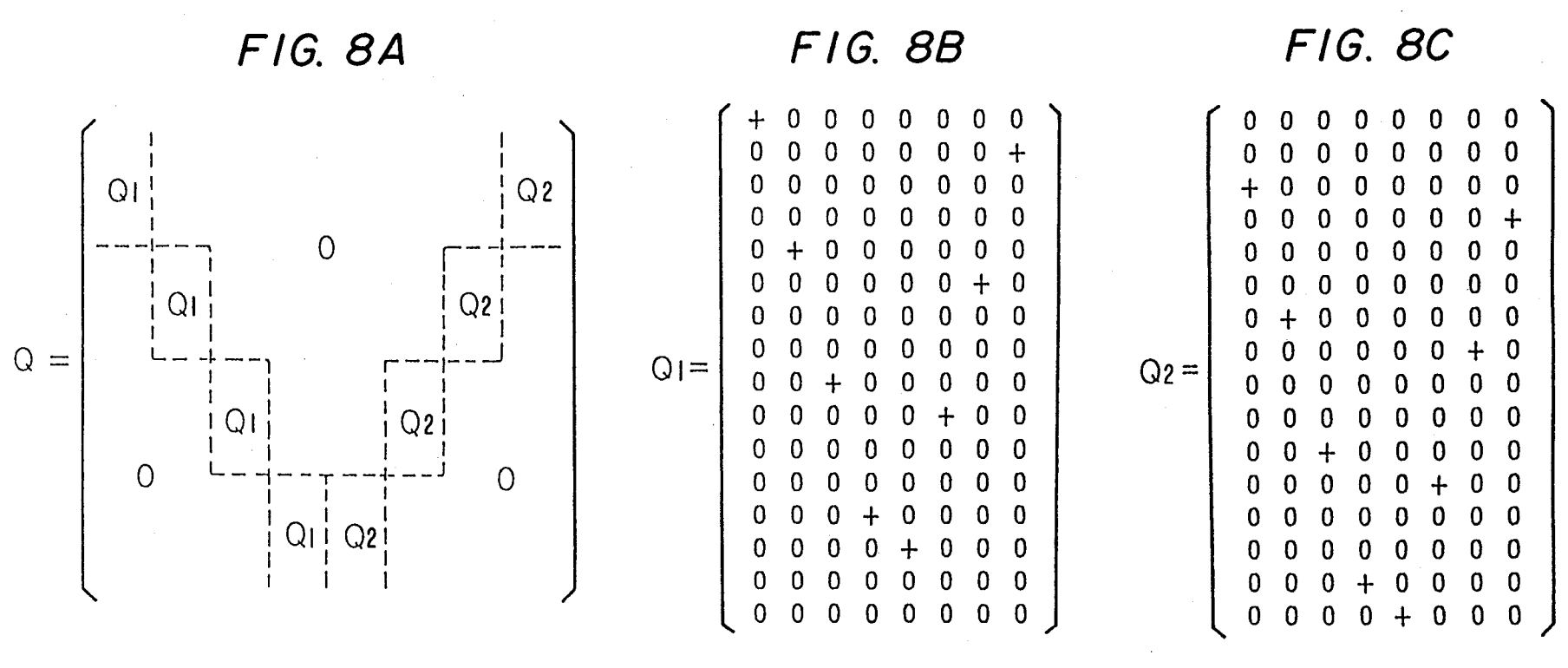

In the rearranging circuit 41, as shown in FIG. 8, only one of respective rows and columns of the matrix [Q] is $+1$ and remaining 63 elements are all 0 so that input data [Xc] of 64 words is rearranged.

The inner product calculating circuit 42 calculates data [Q], [xc] thus rearranged in a calculation processing fashion expressed by the matrix [L] in FIG. 9. As clear from FIG. 9, the matrix [L] is formed of only $+1$ and $-1$ elements. 16 small matrices of 4 rows and 4 columns of the same shape are disposed on diagonal lines and other portions are sparse matrices having 0 element only. Therefore, the above data can be calculated by the four-degree inner product calculating circuit 50 shown in FIG. 6.

As shown in FIG. 6, data [Q] [xc] of 64-word unit are supplied from an input terminal IN. Four data are latched in four latches $52_1$, $52_2$, $52_3$ and $52_4$ and held therein over the 4T time.

Four switches $53_1$, $53_2$, $53_3$ and $53_4$ are switched to plus-side contacts or minus-side contacts when the elements of the small matrix of 4 rows and 4 columns of the matrix [L] are $+1$ or $-1$. Therefore, the coefficient of $+1$ or $-1$ is multiplied with the data held in the latches $52_1$ to $52_4$, added by the adder 55 and then delivered from the output terminal OUT.

64-word data [L] [Q] [Xc] from the inner product calculating circuit 42 are supplied to the second rearranging circuit 43, in which they are rearranged as expressed by matrices [R] shown in FIGS. 10, 11 to 14.

Figures 15A, 15B:
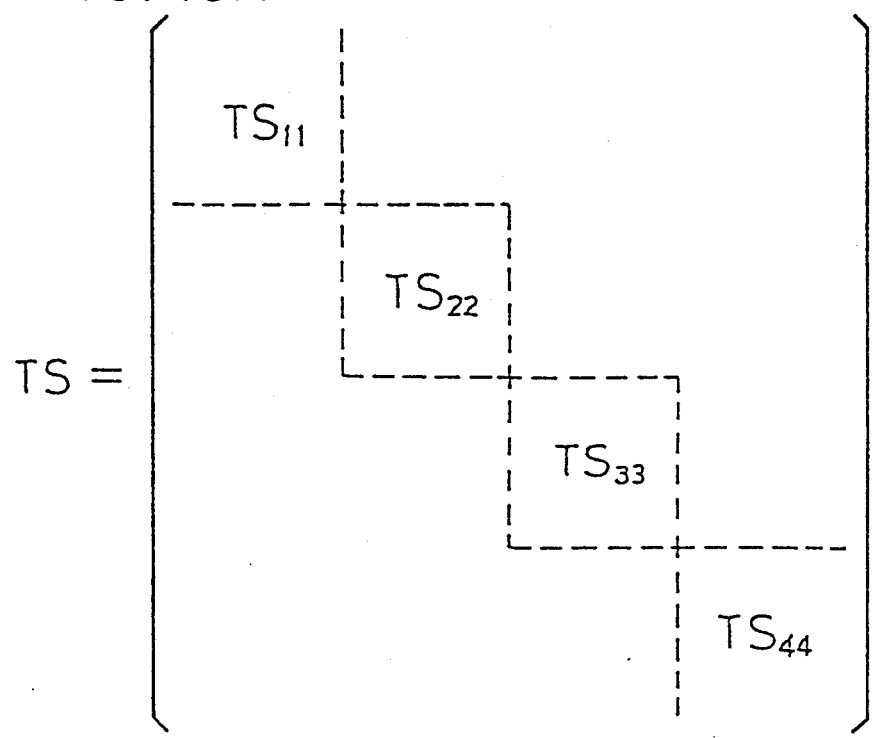

The data [R] [L] [Q] [xc] thus rearranged are calculated by the second inner product calculating circuit 44 in a calculation processing fashion expressed by the matrix [TS] shown in FIGS. 15 and 16. As clear from FIGS. 15 and 16, the matrix [TS] is formed of only elements of 0, $+1$ and $-1$. Also, in this matrix [TS], four small matrices of 16 rows and 16 columns are disposed on diagonal lines and other portions are sparse matrices having all 0 elements so that at least one of elements of odd rows of each column and elements of even rows of each column is 0. Therefore, the above data can be calculated by the 8-degree inner product calculating circuit 60 shown in FIG. 7.

Since other portions than the small matrices of $16 \times 16$ disposed along the diagonal lines are all 0 in the matrix [TS], the input data can be calculated by a 16-degree inner product calculating circuit. In addition, since the elements of the small matrix are formed of all 0 and $\pm 1$, it is sufficient that a value processed by the 2's complement circuit and a value which results from selecting three zeroes may be added to the input data. Having examined each small matrix of 16×16 in the matrix [TS], it is to be understood that any of 0'th and 1st rows of each column is always 0. Any of second row and third row of each column is always 0. Similarly, 2k'th row and 2k+1'th row of each column is always 0 (k=2 to 7). Accordingly, in actual practice, the 16-degree inner product calculating circuit can be formed of the circuit that utilizes 8 adders as shown in FIG. 7.

Generally, the 16-degree inner product calculating circuit needs 16 adders. However, since any of 2k'th row and 2k+1'th row is always 0 (k=0 to 7) as described above, the input data can be calculated by 8 adders as shown in FIG. 7. In the 16 latches shown in FIG. 7, 0 is set by a clear signal (not shown) at a calculation start timing.

In the latch $65_0$, there are stored calculation intermediate result and calculated result of 0'th row of $[TS_{ij}]$ (i=1 to 4) and input vector (0'th to 15th elements of [R] [L] [Q] [Xc] when i=1, 16th to 31st elements of [R][L] [Q] [Xc] when i=2, 32nd and 47th elements of [R] [L] [Q] [xc] when i=3 and 48th and 63rd elements of [R] [L] [Q] [Xc] when i=4).

In the latch $65_1$, there are stored calculated intermediate result and calculated result of first row of $[TS_{ij}]$ (i=1 to 4) and input vector. A selector 1 selects a value from the input terminal when a value in which 0'th or first row of $[TS_{ij}]$ (i=1 to 4) is not 0 is 1, selects a value which results from processing the value from the input terminal by the 2's complement circuit when it is −1 and selects 0 when 0'th and first rows are both 0.

A selector 9 selects the latch $65_{10}$ when 0'th row is not 0 and selects the latch $65_1$ when the first line is not 0. Since any one of 0'th and first rows is always 0, the selector 9 performs the above-mentioned selection so that no contradiction occurs in which the latches $65_0$ and $65_1$ are both selected. When 0'th row and first row are both 0, any of the latches $65_0$ and $65_1$ may be selected. Control signals of the selectors 1 and 9 are controlled by a control circuit 68.

At j'th cycle (j=0 to 15), for example, a j'th element of the above-mentioned input vector is input from the input terminal. A calculation that is performed at timing point in the circuit shown in FIG. 7 will be described.

When an element of 0'th row and j'th column of $[TS_{ij}]$ is 1, the value (calculated intermediate result of 0'th row calculated at j−1'th cycle and input data) stored in the latch $65_0$ is input through the switch $66_1$ to the adder $63_1$. Also, j'th element of the input vector is input through the switch $61_1$ to the adder $63_1$. Then, the adder $63_1$ adds calculated intermediate result of 0'th row calculated at j−1'th cycle and the input data and j'th element of input vector. An added result is stored through the switch $64_1$ to the latch $65_0$.

When an element of 0'th row and j'th column of $[TS_{ij}]$ (i=1 to 4), a value (calculated intermediate result of 0'th row calculated up to j−1'th cycle and the input data) stored in the latch $65_0$ is input through the switch $66_1$ to the adder $63_1$. Also, a value which results from multiplying the j'th element of the input vector with −1 is input through the switch $61_1$ to the adder $63_1$. Then, the adder $63_1$ adds the calculated intermediate result of the 0'th row calculated at j−1'th cycle and the input data and the value which results from multiplying the j'th element of the input vector by −1. An added result is stored through the switch $64_1$ to the latch $65_0$.

That is, when the element of 0'th row and j'th column is ±1, the calculated intermediate result of 0'th row and input data is updated (i.e., addition of value which results from multiplying j'th element of input vector with ±1).

When the element of first row and j'th column of $[TS_{ij}]$ (i=1 to 4), a value (calculated intermediate value of first row calculated put to j−1'th cycle and input data) stored in the latch $65_1$ is input through the switch $66_1$ to the adder $63_1$. Also, the j'th element of the input vector is input through the switch $61_1$ to the adder $63_1$. Then, the adder $63_1$ adds the calculated intermediate result of first row calculated up to the j−1'th cycle and the input data and the j'th element of the input vector. An added result is stored through the switch $64_1$ to the latch $65_1$.

When the element of first row and j'th column of $[TS_{ij}]$ (i=1 to 4) is −1, a value (calculated intermediate result of first row calculated up to the j−'th cycle and the input data) stored in the latch $65_1$ is input through the switch $66_1$ to the adder $63_1$. Also, a value which results from multiplying j'th element of the input vector with −1 is input through the switch $61_1$ to the adder $63_1$. Then, the adder $63_1$ adds the calculated intermediate result of first row calculated up to the j−1'th cycle and the input data and the value which results from multiplying the j'th element of the input vector with −1. Then, an added result is stored through the switch $64_1$ to the latch $65_1$.

That is, when the element of first row and j'th column is ±1, the calculated intermediate result of the first row and the input data is updated (addition of the value which results from multiplying the j'th element of input data with ±).

When the elements of 0'th row and j'th column and first row and j'th column are both 0, any one of the latches is selected by the switch $66_1$ and data is stored again through the adder $63_1$ to the latch selected by the switch $64_1$. At that time, since the 0 is selected by the switch $61_1$ and then input to the adder $63_1$, the addition is not substantially performed by the adder $63_1$. That is, data is not substantially updated in the latches $65_0$ and $65_1$.

As described above, after 16 cycles, the calculated result of 0'th row and the input data is stored in the latch $65_0$ and the calculated result of first row and the input data is stored in the latch $65_1$.

Similarly, in the latches $65_2$ to $65_{15}$, there are stored calculated intermediate results of second to 15th rows of $[TS_{ij}]$ (i=1 to 4) and the input data. After 16 cycles, calculated results (calculated results of second to 15th rows and input data) are stored therein.

These calculated results are input to the parallel-to-serial converter 67, from which there are serially output calculated results in the order of calculated result of 0'th row and input data, calculated result of first row and input data, . . . calculated result of 15th row and input data.

Therefore, a calculation of 16×16 matrix $[TS_{11}]$, a calculation of 16×16 matrix $[TS_{22}]$, a calculation of 16×16 matrix $[TS_{33}]$ and a calculation of 16×16 matrix $[TS_{44}]$ are carried out at every 16 cycles. That is, a calculation of the matrix [TS] is calculated in 64 cycles.

The 64-word data [TS] [R] [L] [Q] [Xc] output from the inner product calculating circuit 44 is further calculated in a calculation processing expressed by the matrix shown in FIGS. 17, 18 in the third inner product calculating circuit 45. As clear from FIGS. 17 and 18, this matrix [V] is a sparse matrix in which four small matrices of 4 rows and 4 columns are disposed on diagonal lines and other portions are all 0 elements. Therefore, such data can be calculated by the ordinary inner product calculating circuit 45 shown in FIG. 1.

The 64-word data [V] [TS] [R] [L] [Q] [Xc] output from the inner product calculating circuit 45 is rearranged as shown by a matrix [W] shown in FIG. 19 and FIGS. 20 to 23. Therefore, there can be obtained predetermined output data [W] [V] [Ts] [R] [L] [Q] [Xc].

In actual practice, the following equation (10) is established as:

$$[Yc] = [M][Xc] \qquad (10)$$
$$= [W][V][TS][R][L][Q][Xc]/8$$

Accordingly, an output result must be divided by 8. This can be effected by shifting the value by 3 bits, which needs no elements from a circuit standpoint and therefore not shown.

In the embodiment of FIG. 5, since the matrices [L], [TS] and [V] expressing the calculation processings of the respective inner product calculating circuits 42, 44 and 45 are all sparse matrices, the number of multiplication can be reduced and the respective inner product calculating circuits can be reduced in circuit scale.

With respect to the inner product calculating circuit 42, the coefficients of matrix [L] is 0, +1 and −1, and with respect to the inner product calculating circuit 44, the coefficients of matrix [TS] are 0, +1 and −1 so that two elements of +1 or −1 are not existing on each row. Thus, as shown in FIGS. 6 and 7, each multiplier can be simplified in circuit arrangement and a rounding error can be avoided when the inner product is calculated.

While elements $x_{11}$ to $x_{88}$ of 8 rows and 8 columns are input in the order of columns and elements $y_{11}$ to $Y_{88}$ of 8 rows and 8 columns are output in the order of columns as shown in FIG. 4, if the above elements are input and output in the different sequential order, then this can be effected by replacing the rearranging circuits 41 and 46 with rearranging circuit that can rearrange data in other proper sequential order.

As described above, according to the above-mentioned apparatus, the inner product calculating circuit can be reduced in circuit scale, and simplified in circuit arrangement. Also, the number of calculation can be reduced and the high speed calculation therefore becomes possible.

Figure 24:
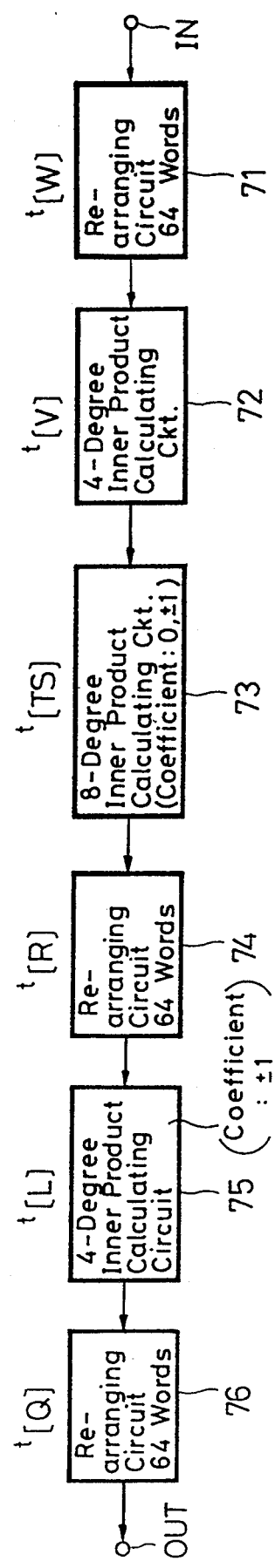
FIG. 24 is a block diagram showing a circuit arrangement of an inverse discrete cosine transform apparatus according to the embodiment of the present invention.

FIG. 24 is a block diagram showing a circuit arrangement of an inverse discrete cosine transform apparatus according to the embodiment of the present invention.

As shown in FIG. 24, data of 8 rows and 8 columns from the input terminal IN is supplied through 64-word first rearranging circuit 71 to a 4-degree first inner product calculating circuit 72. An output of the inner product calculating circuit 72 is supplied to an 8-degree second inner product calculating circuit 73. An output of the inner product calculating circuit 73 is supplied through a 64-word second rearranging circuit 74 to a 4-degree third inner product calculating circuit 75. An output of the inner product calculating circuit 75 is delivered through a 64-word third rearranging circuit 76 to the output terminal OUT.

In the embodiment shown in FIG. 24, the constant matrix [IM] of 64 rows and 64 columns for IDCT is resolved into 6 matrixes expressed by the following equation (11):

$$[IM] = {}^t[Q][L]^t[R]^t[TS]^t[V]^t[W]/8 \qquad (11)$$

The matrices $^t[W]$, $^t[R]$ and $^t[Q]$ correspond to the first, fifth and sixth rearranging circuits 71, 74 and 76. The matrixes $^t[V]$, $^t[TS]$ and [L] correspond to the first, fifth and sixth inner product calculating circuits 72, 73 and 75. In the above-mentioned matrices [L]. [TS] and [V], all small matrices forming them are disposed on the diagonal line and respective transposed matrices $^t[L]$, $^t[TS]$ and $^t[V]$ are similarly formed. Therefore, the inverse transform can be carried out by the arrangement similar to that of the embodiment shown in FIG. 5. In this case, $[L] = {}^t[L]$ is established.

Figure 25:
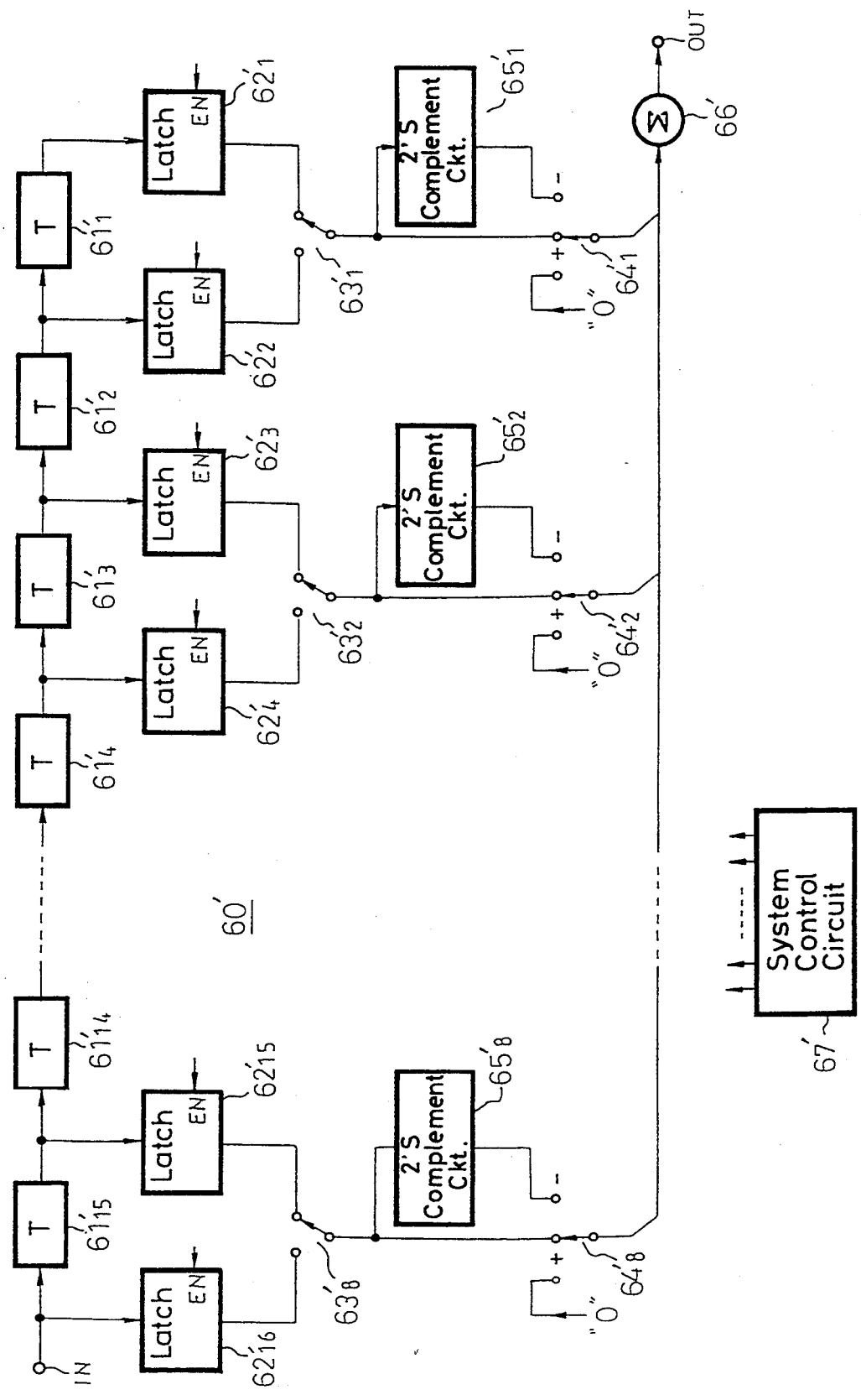
FIG. 25 is a block diagram showing a circuit arrangement of a main portion of the inverse discrete cosine transform apparatus according to the present invention.

In the inner product calculating circuit 73 that carries out the calculation of $^t[TS]$, $^t[TS]$ is calculated by a circuit arrangement shown in FIG. 25 because element of any of the odd column of each row and element of even column adjacent thereto on the right-hand side is at least 0.

In FIG. 25, reference numeral 60' depicts an 8-degree inner product calculating circuit that is equivalent to the inner product calculating circuit 73. 15 unit delay elements $61'_1$, $61'_2$ to $61'_{15}$ are connected in series in the reverse order. 16 latches $62'_1$, $62'_2$ to $62'_{16}$ are respectively connected to output end, respective junctions and input end of the above unit delay elements. Outputs of respective pairs of latches $62'_1$, $62'_2$; $62'_3$, $62'_4$ ... $62'_{15}$, $62'_{16}$ are supplied to respective pairs of contacts of eight change-over switches $63'_1$, $63'_2$ ... $63'_8$. Outputs of the switches $63'_1$ to $63'_8$ are supplied to respective plus-side contacts of eight change-over switches $64'_1$ to $64'_8$ and also supplied through eight 2's complement circuits $65'_1$ to $65'_8$ to respective minus-side contacts of switches $64'_1$ to $64'_8$. A coefficient 0 is supplied to third contacts of the switches $64'_1$ to $64'_8$, and outputs of the switches $64'_1$ to $64'_8$ are supplied to an adder 66'.

The change-over switches $64'_1$ to $64'_8$ constitute multipliers having coefficients 0, +1 and −1 together with the 2's complement circuits $65'_1$ to $65'_8$ and are independently switched together with the switches $63'_1$ to $63'_8$ under the control of a system control circuit 67'.

As shown in FIG. 25, 64-word unit data [TS] [R] [L] [Q] [Xc] are supplied from the input terminal IN. Then, 16 data are latched to the 16 latches $62'_1$ to $62'_{16}$ and held therein over 17T time.

The eight switches $63'_1$ to $63'_8$ are switched to the non-zero side when any of adjacent elements of small matrices of 16×16 of the matrix [TS] is 0 so that 8 data of data held in the latches $62'_1$ to $62'_{16}$ are produced. When adjacent elements are both 0, the corresponding switches $63'_1$ to $63'_8$ may be switched to any contact sides.

The eight switches $64'_1$ to $64'_8$ are switched to 0-side, plus-side and minus-side when the elements of small matrix of 16 rows and 16 columns corresponding to the 8 data thus derived are 0, +1 or −1, whereby the 8 data thus derived are multiplied with the coefficient 0, +1 or −1 and then added by the adder 66' whose added result is delivered from the output terminal OUT.

Figure 26:
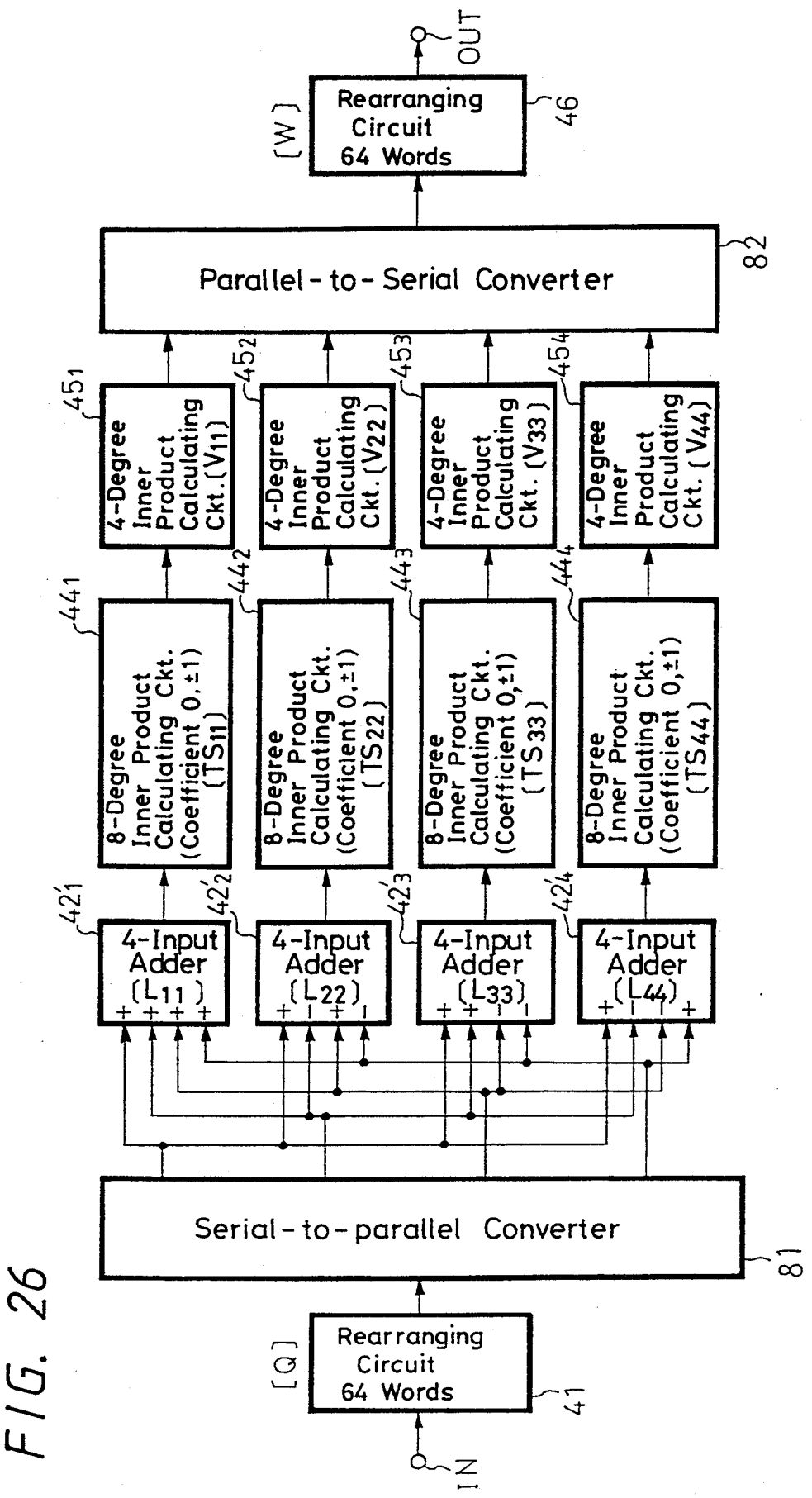
FIG. 26 is a block diagram showing a circuit arrangement of the discrete cosine transform apparatus according to another embodiment of the present invention.

FIG. 26 shows another embodiment of the present invention in which the first, second and third inner product calculating circuits 42, 44 and 45 are respectively as parallel circuits to thereby increase operation speed in the discrete cosine transform apparatus. As shown in FIG. 26, after the matrix [Q] is calculated by the rearranging circuit 41, a set of four data serially output to the output [Q] [Xc] are converted into parallel data by a serial-to-parallel circuit 81 and then input to 4-input adding circuits $42'_1$ to $42'_4$.

The 4-input adding circuit $42'_1$ calculates first row, fifth row, ninth row . . . 61st row of [L]. The 4-input adding circuit $42'_2$ calculates second row, sixth row, tenth row . . . 62nd row of [L]. The 4-input adding circuit $42'_3$ calculates third row, seventh row, 11th row . . . 63rd row of [L]. Then, the 4-input adding circuit $42'_4$ calculates first row, eighth row, 12th row . . . 64th row of [L].

The calculation [R] is merely a rearrangement and enables the calculation of four small matrixes [TS$_{11}$] [TS$_{22}$] [TS$_{33}$] [TS$_{44}$] to be effected under the condition that there are provided four sets of data formed of 16 data of first row, fifth row, ninth row . . . 61st row, 16 data formed of second row, sixth row, tenth row . . . 62nd row, 16 data formed of third row, seventh row, 11th row . . . 63rd row, and 16 data formed of fourth row, eighth row, 12th row . . . 64th row of [L] [Q] [xc].

Accordingly, in the case of the circuit shown in FIG. 26, the 4-input adding circuit $42'_1$ outputs values of first row, fifth row, ninth row . . . 61st row of [L] [Q] [Xc]. The 4-input adding circuit $42'_2$ outputs values of second row, sixth row, tenth row . . . 62nd row of [L] [Q] [xc]. The 4-input adding circuit $42'_3$ outputs values of third row, seventh row, 11th row . . . 63rd row of [L] [Q] [Xc]. The 4-input adding circuit $42'_4$ outputs values of first row, eighth row, 12th row . . . 64th row of [L] [Q] [xc]. Therefore, a circuit that carries out the calculation [R] is not required and outputs of the 4-input adding circuits $42'_1$ to $42'_4$ may be directly input to the corresponding inner product calculating circuits $44_1$ to $44_4$.

That is, the inner product calculating circuit $44_1$ carries out the calculation of [TS$_{11}$] by utilizing values of first row, fifth row, ninth row . . . 61st row of [L] [Q] [Xc]. Similarly, the inner product calculating circuits $44_2$, $44_3$ and $44_4$ calculate [TS$_{22}$] [TS$_{33}$] and [TS$_{44}$].

Further, the output of the inner product calculating circuit $44_1$ is input to the inner product calculating circuit $45_1$ so that the inner product calculating circuit $45_1$ calculates [V$_{11}$]. Similarly, the inner product calculating circuits $45_2$, $45_3$ and $45_4$ calculate [V$_{22}$] [V$_{33}$] [V$_{44}$].

The inner product calculating circuits $45_1$ to $45_4$ outputs [V] [TS] [R] [L] [Q] [Xc]. Thus, if these outputs are converted into serial data by a parallel-to-serial converter 82 and finally [W] is rearranged by the rearranging circuit 46, then an output [Yc] can be obtained.

Figure 27:
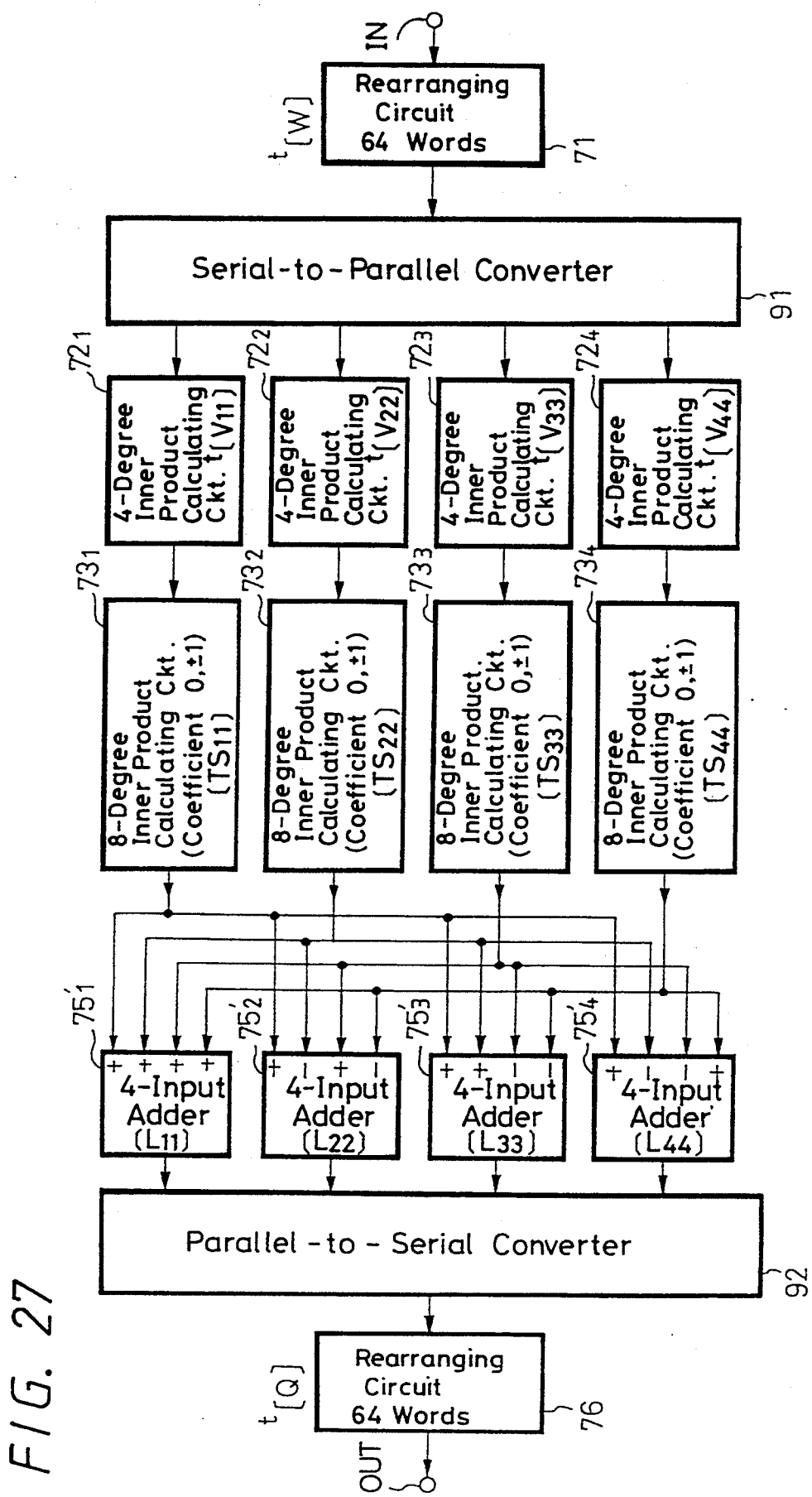
FIG. 27 is a block diagram showing a circuit arrangement of the inverse discrete cosine transform apparatus according to another embodiment of the present invention.

FIG. 27 shows a third embodiment of the present invention in which the first, second and third inner product calculating circuits 72, 73 and 75 are provided as parallel circuit to thereby increase the operation speed in the inverse discrete cosine transform apparatus. As shown in FIG. 27, after $^t$[W] is calculated by a rearranging circuit 71, a set of four data serially output for outputs $^t$[W] [Yc] is converted into parallel data by a serial-to-parallel circuit 91 and then input to inner product calculating circuits $72_1$ to $72_4$.

The inner product calculating circuits $72_1$ to $72_4$ perform the calculation of $^t$[V$_{11}$] to $^t$[V$_{44}$]. Outputs of the inner product calculating circuits $72_1$ to $72_4$ are input to respective inner product calculating circuits $73_1$ to $73_4$. The inner product calculating circuits $73_1$ to $73_4$ carry out the calculation of $^t$[TS$_{11}$] to $^t$[TS$_{44}$].

Outputs of the inner product calculating circuits $73_1$ to $73_4$ are directly supplied to 4-input adding circuits $75'_1$ to $75'_4$. The 4-input adding circuits $75'_1$ to $75'_4$ perform the calculation of [L$_{11}$] to [L$_{44}$]. Then, the 4-input adding circuits $75'_1$ to $75'_4$ output [L] $^t$[R]$^t$[TS]$^t$[V]$^t$[W][Yc]. Thus, if these output data are converted into serial data by a parallel-to-serial converter 92 and $^t$[Q] is finally rearranged by the rearranging circuit 76, then an output [Yc] can be obtained.

As described above in detail, according to the present invention, since the predetermined constant matrix is resolved into a plurality of sparse matrices where elements of one sparse matrix are set to 0, +1 and −1 and elements of other low-order sparse matrix are set to data component of constant matrix, it is possible to obtain the discrete cosine apparatus and the inverse discrete cosine transform apparatus in which a circuit scale of the inner product calculating circuit can be reduced, the circuit arrangement can be simplified, and the number of calculation can be reduced to increase the calculation speed.

However, when the calculation processing is carried out by the 4-degree inner product calculating circuit, the multiplication must be carried out a number of times. Therefore, the calculation speed cannot be increased without difficulty, which hinders the processing speed of the whole apparatus from being increased.

When the calculation expressed by the following equation (12) is carried out, $$\begin{bmatrix} Q_0 \\ Q_1 \\ Q_2 \\ Q_3 \end{bmatrix} = \begin{bmatrix} 1 & 1/\sqrt{2} & \cos(2\pi/16) & -\cos(6\pi/16) \\ 1 & -1/\sqrt{2} & \cos(6\pi/16) & \cos(2\pi/16) \\ 1 & -1/\sqrt{2} & -\cos(6\pi/16) & -\cos(2\pi/16) \\ 1 & 1/\sqrt{2} & -\cos(2\pi/16) & \cos(6\pi/16) \end{bmatrix} \begin{bmatrix} P_0 \\ P_1 \\ P_2 \\ P_3 \end{bmatrix} \quad (12)$$

In order to calculate, for example $$Q_0 = P_0 + (1/\sqrt{2}) \times P_1 + (\cos(2\pi/16)) \times P_2 + (\cos(6\pi/16)) \times P_3$$

the value $P_1$ must be multiplied with $(1/\sqrt{2})$, the value $P_2$ must be multiplied with $(\cos(2\pi/16))$ and the value $P_3$ must be multiplied with $(-\cos(6\pi/16))$. Therefore, three multiplications are required. Similarly, with respect to the values $Q_1$, $Q_2$, and $Q_3$, three multiplications are each required. Consequently, 12 multiplications in total are required to obtain all values $Q_0$ to $Q_3$.

When the above equation (12) is calculated, $$\cos(6\pi/16) = (\sqrt{2} - 1) \times \cos(2\pi/16)$$

$$\cos(2\pi/16) = (\sqrt{2} - 1) \times \cos(6\pi/16)$$

in the equation (12) are utilized. By using the above relationships, $$\begin{aligned} Q_0 &= P_0 + (1/\sqrt{2}) \times P_1 + \cos(2\pi/16) \times P_2 + \\ &\quad (-\cos(6\pi/16) \times P_3 \\ &= E_3 + E_8 \end{aligned}$$

$$\begin{aligned} Q_1 &= P_0 + (-1/\sqrt{2}) \times P_1 + \cos(6\pi/16) \times P_2 + \\ &\quad \cos(2\pi/16) \times P_3 \\ &= E_4 + E_5 \end{aligned}$$

-continued $$Q_2 = P_0 + (-1/\sqrt{2}) \times P_1 + (-\cos(6\pi/16)) \times P_2 + (-\cos(2\pi/16) \times P_3$$
$$= E_4 - E_5$$

$$Q_2 = P_0 + (1/\sqrt{2}) \times P_1 + (-\cos(2\pi/16) \times P_2 + \cos(6\pi/16) \times P_3$$
$$= E_3 - E_8$$

where the above equations can be modified as:

$$E_0 = (1/\sqrt{2}) \times P_1$$
$$E_1 = (\cos(6\pi/16) \times P_2$$
$$E_2 = (\cos(2\pi/16) \times P_3$$
$$E_3 = P_0 + E_0$$
$$E_4 = P_0 - E_0$$
$$E_5 = E_1 + E_2$$
$$E_6 = E_1 - E_2$$
$$E_7 = \sqrt{2} \times E_6$$
$$E_8 = E_5 + E_7$$

Therefore, the aforesaid equations from $E_0$ to $E_8$ are calculated and further, there must be calculated the following equations:

$$Q_0 = E_3 + E_8$$

$$Q_1 = E_4 + E_5$$

$$Q_2 = E_4 - E_5$$

$$Q_3 = E_3 - E_8$$

Figure 28:
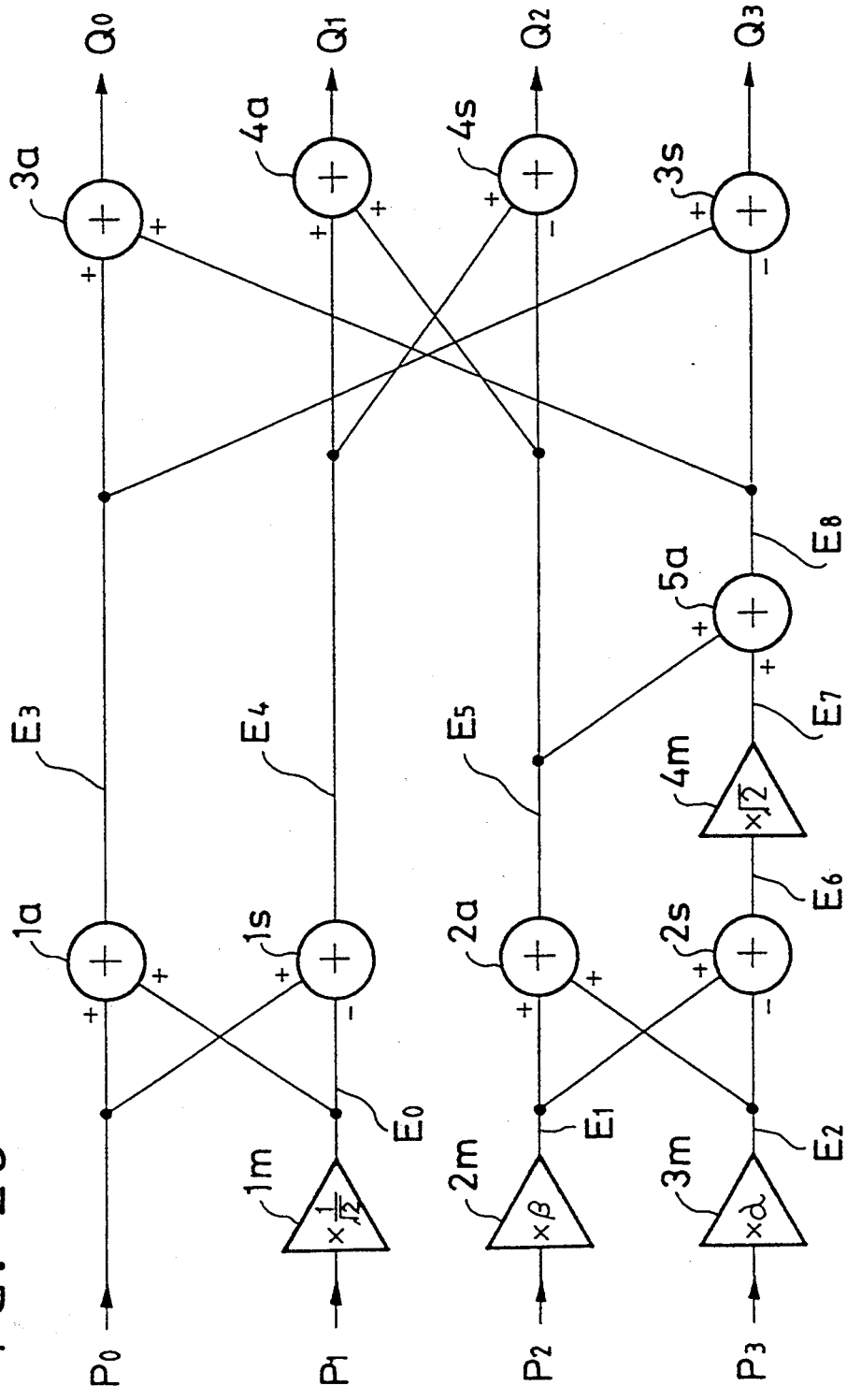
FIG. 28 is a diagram showing a circuit arrangement of a second calculating circuit of a matrix calculating circuit according to the present invention.

The above equations are realized by a circuit arrangement shown in FIG. 28. As shown in FIG. 28, the value $P_0$ is supplied to an adding input of an adder $1a$ and an adding input of a subtractor $1s$. The value $P_1$ is supplied through a multiplier $1m$ of $\times 1/\sqrt{2}$ to an adding input of the adder $1a$ and a subtracting input of the subtractor $1s$. The value $P_2$ is supplied through a multiplier $2m$ of $\times \cos(2\pi/16)$ to an adding input of an adder $2a$ and an adding input of a subtractor $2s$. Then, the value $P_3$ is supplied through a multiplier $3m$ of $\times \cos(6\pi/16)$ to the adding input of the adder $2a$ and a subtracting input of the subtractor $2s$.

An added output of the adder $1a$ is supplied to an adding input of an adder $3a$ and an adding input of a subtractor $3s$. A subtracted output of the subtractor is supplied to an adding input of an adder $4a$ and an adding input of a subtractor $4s$. An added output of the adder $2a$ is supplied to an adding input of an adder $4a$, a subtracting input of a subtractor $4s$ and an adding input of an adder $5a$. A subtracted output of the subtractor $2s$ is supplied through a multiplier $4m$ of $\times \sqrt{2}$ to an adding input of an adder $5a$, and an added output of the adder $5a$ is supplied to the adding input of the adder $3a$ and the subtracting input of the subtractor $3s$.

Then, the value $Q_0$ is obtained from the added output of the adder $3a$, the value $Q_1$ is obtained from the added output of the adder $4a$, the value $Q_2$ is obtained from the subtracted output of the subtractor $4s$ and the value $Q_3$ is obtained from the subtracted output of the subtractor $3s$.

Accordingly, in this circuit, the value $Q_0$ to $Q_3$ can be obtained by four multiplications and the calculation processing can be carried out by the multiplication number of $\frac{1}{3}$.

When the above equation (12) is calculated, $$\cos(\pi/16) = (1/\sqrt{2}) \times \cos(3\pi/16) + \cos(5\pi/16)$$

$$\cos(7\pi/16) = (1/\sqrt{2}) \times \cos(3\pi/16) - \cos(5\pi/16)$$

in the above equation (12) is utilized.
By using the above relationships, $$U_0 = \cos(3\pi/16) \times T_0 + \cos(\pi/16) \times T_1 + \cos(7\pi/16) \times T_2 + \cos(5\pi/16) \times T_3 = G_6 + G_8$$

$$U_1 = (-\cos(5\pi/16)) \times T_0 + \cos(7\pi/16) \times T_1 + (-\cos(\pi/16)) \times T_2 + \cos(3\pi/16) \times T_3 = G_9 - G_7$$

where the above equations can be modified as:

$$G_0 = T_1 + T_2$$
$$G_1 = T_1 - T_2$$

$$G_2 = (1/\sqrt{2}) \times G_0$$

$$G_3 = (1/\sqrt{2}) \times G_1$$
$$G_4 = T_0 + G_2$$
$$G_5 = T_3 + G_3$$
$$G_6 = (\cos(3\pi/16)) \times G_4$$
$$G_7 = (\cos(5\pi/16)) \times G_4$$
$$G_8 = (\cos(5\pi/16)) \times G_5$$
$$G_9 = (\cos(3\pi/16)) \times G_5$$

Therefore, the above equations of $G_0$ to $G_9$ are calculated. Then, $U_0 = G_6 + G_8$ and $U_1 = G_9 - G_7$ are calculated.

Figure 29:
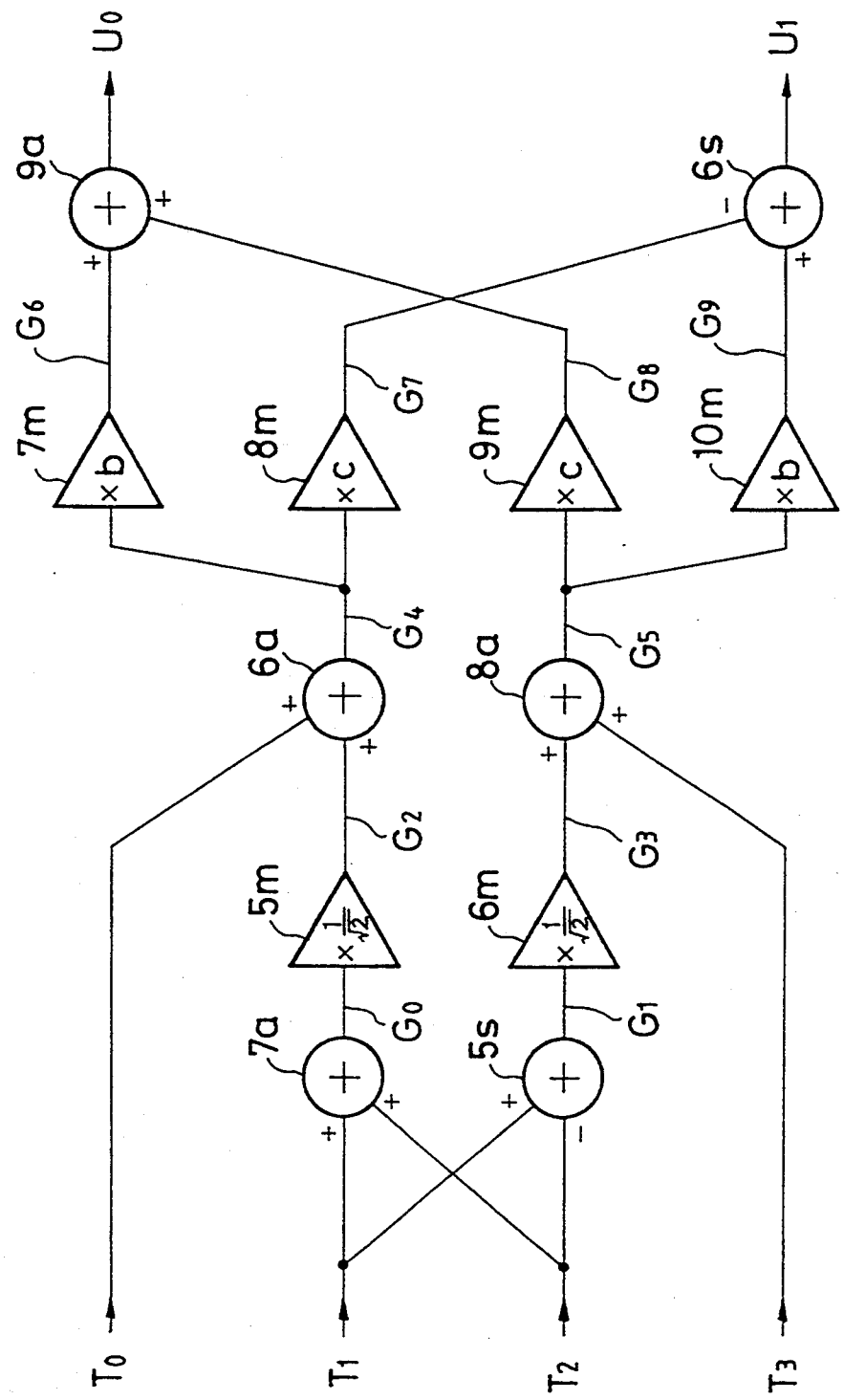
FIG. 29 is a diagram showing a circuit arrangement of third and eighth calculating circuit of the matrix calculating circuit according to the present invention.

The above calculations are realized by a circuit arrangement shown in FIG. 29. As shown in FIG. 29, the value $T_0$ is supplied to an adding input of an adder $6a$ and the value $T_1$ is supplied to an adding input of an adder $7a$ and an adding input of a subtractor $5s$. Then, the value $t_2$ is supplied to an adding input of an adder $7a$ and a subtracting input of the subtractor $5s$, and the value $T_3$ is supplied to an adding input of an adder $8a$.

An added output of the adder $7a$ is supplied through the multiplier $5m$ of $\times 1\sqrt{2}$ to the adding input of the adder $6a$, and the subtracted output of the subtractor $5s$ is supplied through a multiplier $6m$ of $\times 1\sqrt{2}$ to an adding input of an adder $8a$.

Further, the added output of the adder $6a$ is supplied through a multiplier $7m$ of $\times \cos(3\pi/16)$ to an adding input of an adder $9a$ and an added output of the adder $6a$ is supplied through a multiplier $8m$ of $\times \cos(5\pi/16)$ to the subtracting input of the subtractor $6s$. An added output of the adder $8a$ is supplied through a multiplier $9m$ of $\times \cos(5\pi/16)$ to an adding input of an adder $9a$ and the added output of the adder $8a$ is supplied through a multiplier $10m$ of $\times \cos(3\pi/16)$ to the adding input of the subtractor $6s$.

Then, the value $U_0$ is obtained from the added output of the adder $9a$ and the value $U_1$ is obtained from the subtracted output of the subtractor $6s$.

Accordingly, in this circuit, the value $U_0$ and $U_1$ can be obtained by six multiplications and the number of multiplications, i.e., 8 multiplications can be reduced.
When the above equation (12) is calculated, $$\cos(3\pi/16) = (1/\sqrt{2}) \times \cos(\pi/16) + \cos(7\pi/16)$$

-continued $$\cos(5\pi/16) = (1/\sqrt{2}) \times \cos(\pi/16) - \cos(7\pi/16)$$

in the equation (12) are utilized.

By using the above relationships, $$U_0 = \cos(3\pi/16) \times T_0 + \cos(\pi/16) \times T_1 + \cos(7\pi/16) \times T_2 + \cos(5\pi/16) \times T_3 = H_6 + H_8$$

$$U_1 = (-\cos(5\pi/16)) \times T_0 + \cos(7\pi/16) \times T_1 + (-\cos(\pi/16)) \times T_2 + \cos(3\pi/16) \times T_3 = H_7 - H_9$$

where these equations can be modified as:

$$H_0 = T_0 + T_3$$
$$H_1 = T_0 - T_3$$
$$H_2 = (1/\sqrt{2}) \times H_0$$
$$H_3 = (1/\sqrt{2}) \times H_1$$
$$H_4 = T_1 + H_2$$
$$H_5 = T_2 + H_3$$
$$H_6 = (\cos(\pi/16)) \times H_4$$
$$H_7 = (\cos(7\pi/16)) \times H_4$$
$$H_8 = (\cos(7\pi/16)) \times H_5$$
$$H_9 = (\cos(\pi/16)) \times H_5$$

Accordingly, the above equations from $H_0$ to $H_9$ are calculated. Further, $U_0 = H_6 + H_8$ and $U_1 = H_7 - H_9$ are calculated.

Figure 30:
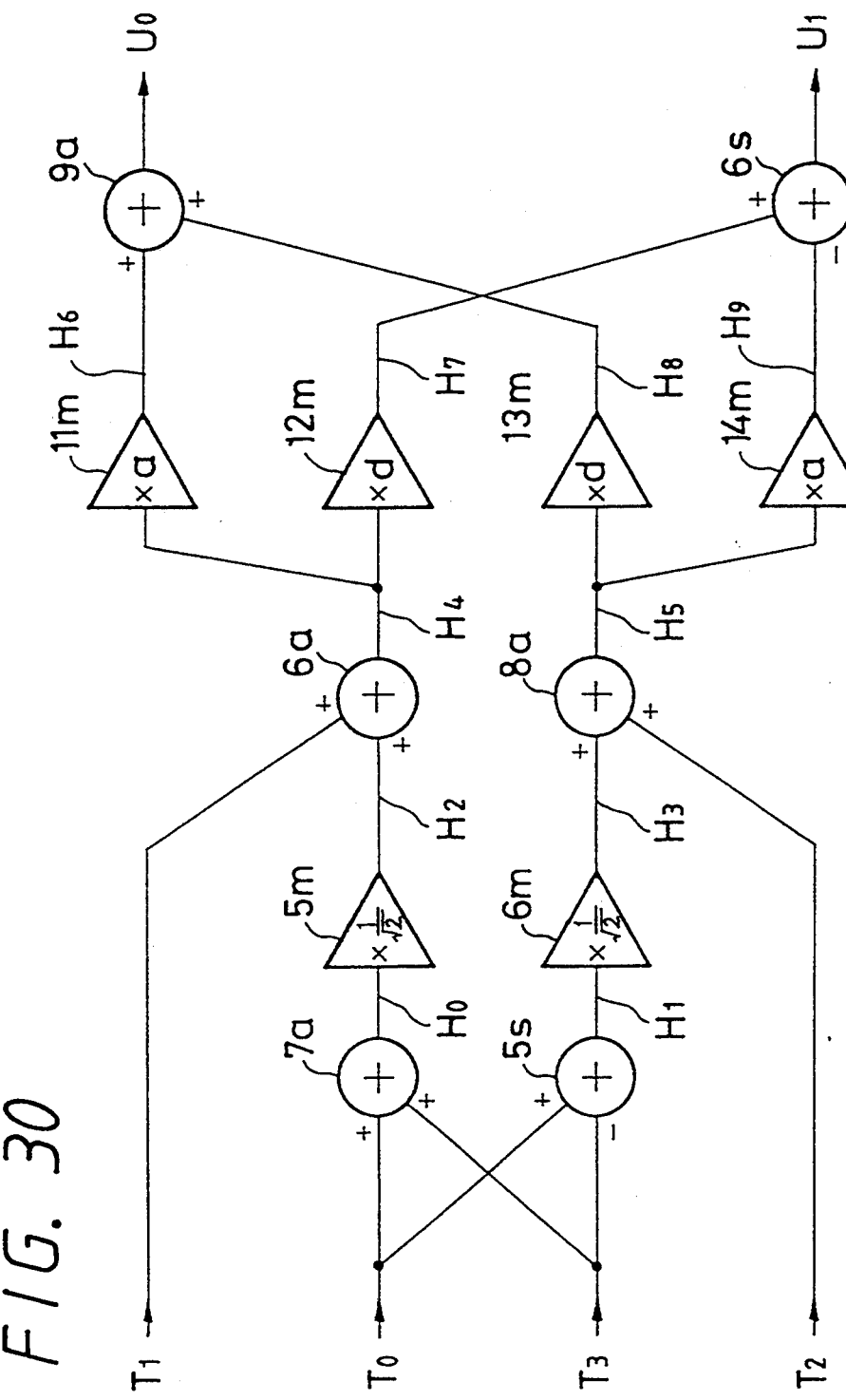
FIG. 30 is a diagram showing a circuit arrangement of another examples of the third and eighth calculating circuits of the matrix calculating circuit according to the present invention.

The above calculations can be realized by a circuit arrangement shown in FIG. 30. As shown in FIG. 30, the value $T_1$ is supplied to the adding input of the adder 6a, and the value $T_0$ is supplied to an adding input of an adder 7a and the adding input of the subtractor 5s. The value $T_3$ is supplied to the adding input of the adder 7a and the subtracting input of the subtractor 5s, and the value $T_2$ is supplied to the adding input of the adder 8a.

The added output of the adder 7a is supplied through the multiplier 5m of $\times 1/\sqrt{}$ to the added input of the adder 6a and the subtracted output of the subtractor 5s is supplied through the multiplier 6m of $\times 1/\sqrt{}$ to the added input of the adder 8a.

Further, the added output of the adder 6a is supplied through a multiplier 11m of $\times \cos(\pi/16)$ to an adding input of an adder 9a, and the added output of the adder 6a is supplied through a multiplier 12m of $\times \cos(7\pi/16)$ to the adding input of the subtractor 6s. The added output of the adder 8a is supplied through a multiplier 13m of $\times \cos(7\pi/16)$ to the adding input of the adder 9a and the added output of the adder 8a is supplied through a multiplier 14m of $\times \cos(\pi/16)$ to the subtracting input of the subtractor 6s.

Then, the value $U_0$ is obtained from the added output of the adder 9a and the value $U_1$ is obtained from the subtracted output of the subtractor 6s.

Accordingly, in this circuit, the values $U_0$ and $U_1$ can be obtained by six multiplications and the number of multiplication can be reduced.

When the above equation (12) is calculated, in the equation (12), $$W_0 = \cos(2\pi/16) \times J_0 + \cos(6\pi/16) \times J_1$$

$$W_1 = \cos(2\pi/16) \times J_2 + \cos(6\pi/16) \times J_3$$

where these equations can be modified as:

$$J_0 = V_0 + V_1$$
$$J_1 = V_2 + V_3$$
$$J_2 = V_0 - V_1$$
$$V_3 = V_2 - V_3$$

Therefore, these equations are calculated and then the above modified equations are calculated.

Figure 31:
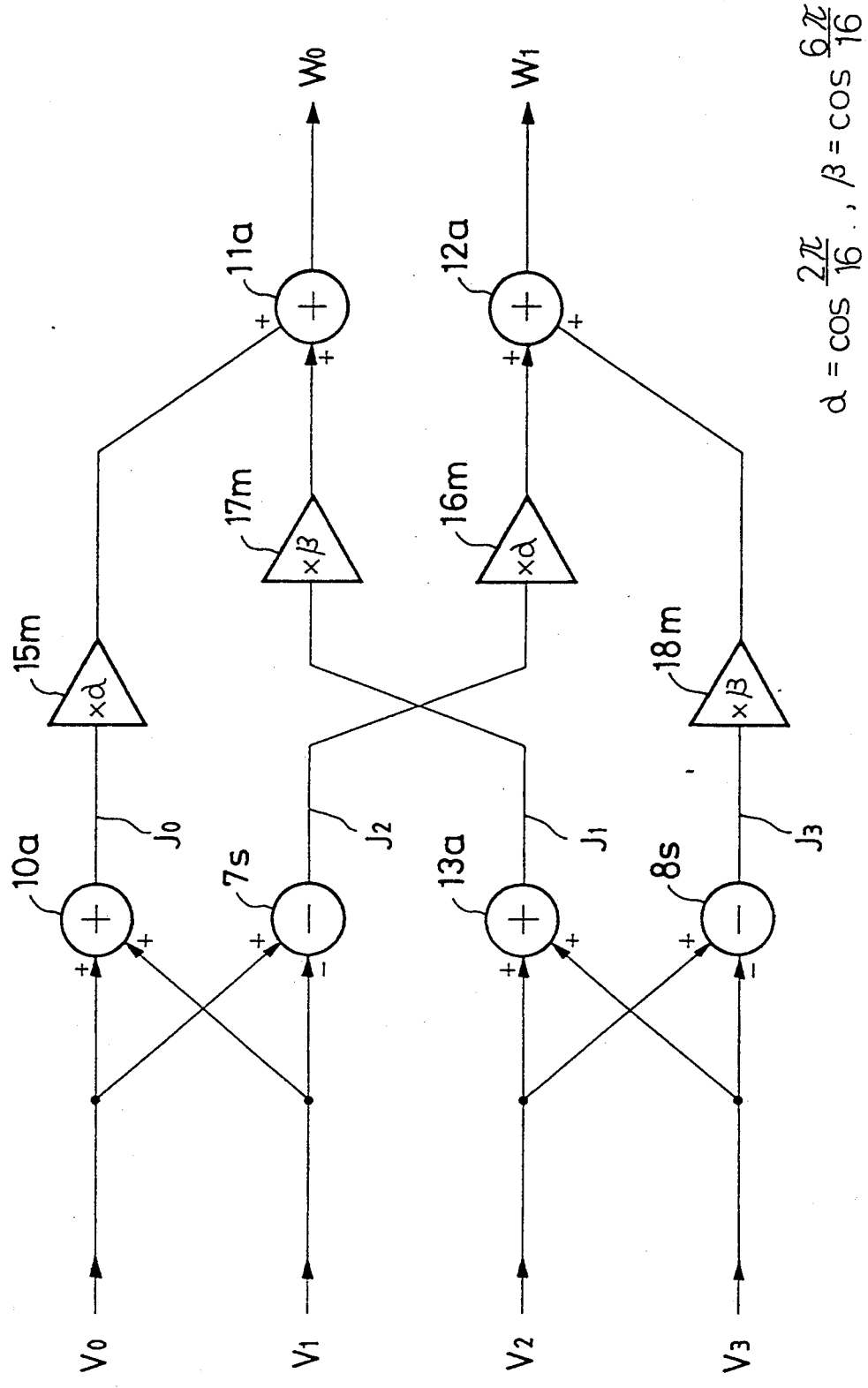
FIG. 31 is a diagram showing a circuit arrangement of fourth and ninth calculating circuits of the matrix calculating circuit according to the present invention.

The above calculations can be realized by a circuit arrangement shown in FIG. 31. As shown in FIG. 31, the values $V_0$ and $V_1$ are supplied through an adder 10a and the multiplier 15m of $\times \cos(2\pi/16)$ to the adding input of the adder 11a. The values $V_0$ and $V_1$ are supplied through the subtractor 7s and the multiplier 16m of $\times \cos(2\pi/16)$ to the adding input of the adder 12a.

The values $V_2$ and $V_3$ are supplied through the adder 13a and a multiplier 17m of $\times \cos(6/16)$ to an adding input of an adder 11a. The values $V_2$ and $V_3$ are supplied through the subtractor 8s and the multiplier 17m of $\times \cos(6\pi/16)$ to an adding input of an adder 12a.

In this circuit, the multipliers 15m to 18m may be disposed ahead of the adders 10a, 13a and the subtractors 7s, 8s.

Then, the value $W_0$ is obtained from the added output of the adder 11a and the value $W_1$ is obtained from the added output of the adder 12a.

Accordingly, in this circuit, the values $W_0$ and $W_1$ can be obtained by four multiplications and the number of multiplications can be reduced.

When the above equation (12) is calculated, in this equation, $$Y_0 = X_0 + K_0$$

$$Y_1 = X_0 - K_0$$

where these equations can be modified as:

$$K_0 = (1/\sqrt{2}) \times (X_2 + X_3)$$

Therefore, these equations are first calculated and then the above modified equations are calculated.

Figure 32:
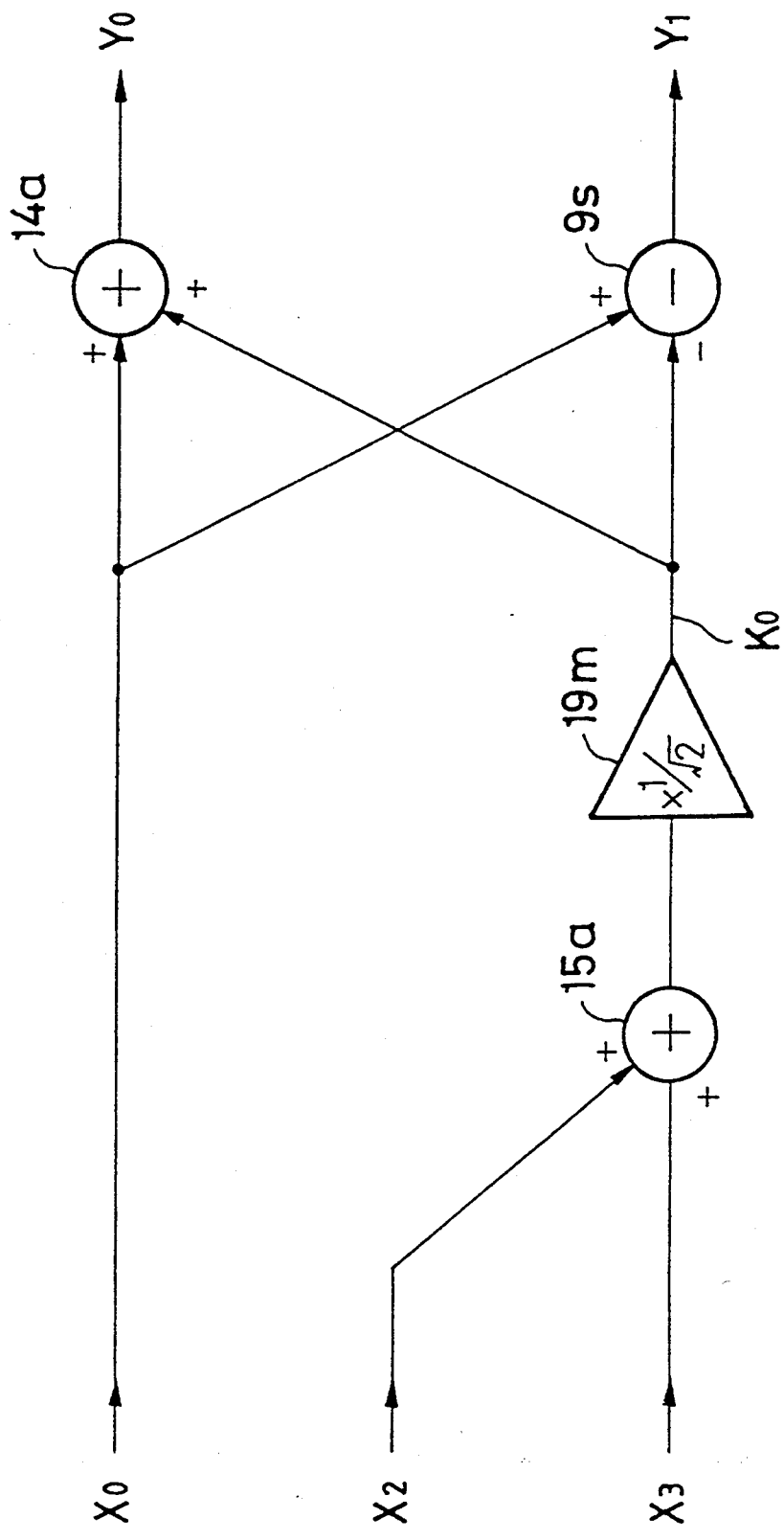
FIG. 32 is a diagram showing a circuit arrangement of a fifth calculating circuit of the matrix calculating circuit according to the present invention.

The above calculations can be realized by a circuit arrangement of FIG. 32. As shown in FIG. 32, the value $X_0$ is supplied to an adding input of an adder 14a and an adding input of a subtractor 9s. The values $X_2$ and $X_3$ are supplied through an adder 15a and a multiplier 19m of $\times 1/\sqrt{2}$ to an adding input of an adder 14a and a subtracting input of the subtractor 9s.

Then, the value $Y_0$ can be obtained from the added output of the adder 14a and the value $Y_1$ can be obtained from the subtracted output of the subtractor 9s.

Accordingly, in this circuit, the values $Y_0$ and $Y_1$ can be obtained by two multiplications and the number of multiplications can be reduced.

When the above equation is calculated, in this equation, $$\cos(6\pi/16) = (\sqrt{2} - 1) \times \cos(2\pi/16)$$
$$\cos(2\pi/16) = (\sqrt{2} - 1) \times \cos(6\pi/16)$$

are utilized. By using the above relationship, $$S_0 = R_0 + R_1 + R_2 + R_3$$
$$= F_0 + F_1$$

$$S_1 = (1/\sqrt{2}) \times R_0 + (-1/\sqrt{2}) \times R_1 +$$
$$(-1/\sqrt{2}) \times R_2 + (1/\sqrt{2}) \times R_3$$
$$= (1/\sqrt{2})F_6$$

$$S_2 = \cos(2\pi/16) \times R_0 + \cos(6\pi/16) \times R_1 +$$
$$(-\cos(6\pi/16)) \times R_3$$
$$= \cos(6\pi/16)F_7$$

$$S_3 = (-\cos(6\pi/16))R_0 + \cos(2\pi/16) \times R_1 +$$
$$(-\cos(2\pi/16)) \times R_2 + \cos(6\pi/16) \times R_3$$
$$= \cos(2\pi/16)F_8$$

where these equations can be modified as:

$$F_0 = R_0 + R_3$$
$$F_1 = R_1 + R_2$$
$$F_2 = R_1 + R_2$$
$$F_3 = R_0 + R_3$$
$$F_4 = F_2 + F_3$$
$$F_5 = \sqrt{2} \times F_3$$
$$F_6 = F_0 + F_1$$
$$F_7 = F_4 + F_5$$
$$F_8 = F_4 + F_5$$

Accordingly, these equations are calculated and further the following equations are calculated in the following order as:

$$S_0 = F_0 + F_1$$
$$S_1 = (1/\sqrt{2}) \times F_6$$
$$S_2 = \cos(6\pi/16) \times F_7$$
$$S_3 = \cos(2\pi/16) \times F_8$$

Figure 33:
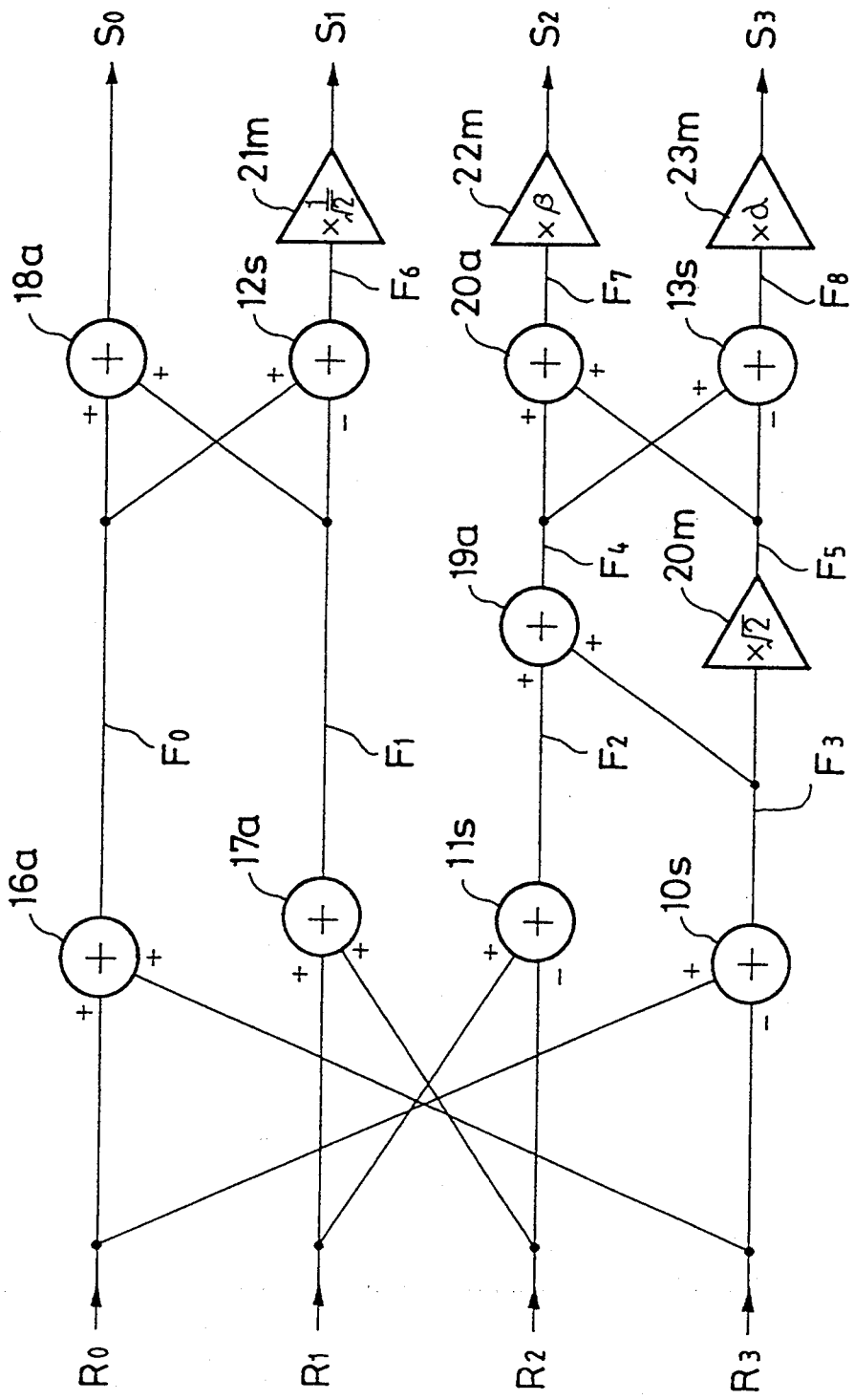
FIG. 33 is a diagram showing a circuit arrangement of a seventh calculating circuit of the matrix calculating circuit according to the present invention.

The above calculations can be realized by a circuit arrangement shown in FIG. 33. As shown in FIG. 33, the value $R_0$ is supplied to an adding input of an adder 16a and an adding input of a subtractor 10s. The value $R_1$ is supplied to an adding input of an adder 17a and an adding input of the subtractor 11s. Then, the value $R_2$ is supplied to an adding input of the adder 17a and a subtracting input of the subtractor 11s, and the value $R_3$ is supplied to the adding input of the adder 16a and the subtracting input of the subtractor 10s.

The added output of the adder 16a is supplied to an adding input of an adder 18a and an adding input of a subtractor 12s. The added output of the adder 17a is supplied to an adding input of an adder 18a and a subtracting input of a subtractor 12s. A subtracted output of the subtractor 11s is supplied to an adding input of an adder 19a and the subtracted output of the subtractor 10s is supplied to an adding input of an adder 19a. The added output of the adder 19a is supplied to an adding input of an adder 20a and an adding input of the subtractor 13s. A subtracted output of the subtractor 10s is supplied through a multiplier 20m of $\times\sqrt{2}$ to an adding input of an adder 20a and the subtracting input of the subtractor 13.

The value $S_0$ is obtained from the added output of the adder 18a and the value $S_1$ is obtained from the subtracted output of the subtractor 12s through a multiplier 21m of $\times 1/\sqrt{2}$. The value $S_2$ is obtained from the added output of the adder 20a through a multiplier 22m of $\times\cos(6\pi/16)$. Then, the value $S_3$ is obtained from the subtracted output of the subtractor 13s through a multiplier 23m of $\times\cos(2\pi/16)$.

Accordingly, in this circuit, the values $S_0$ to $S_3$ can be obtained by four multiplications and the number of multiplications can be reduced.

When the above-mentioned equation is calculated, in this equation, $$A_0 = L_0 + L_1$$

$$A_1 = L_0 - L_1$$

where these equations can be modified as:

$$L_0 = (1/\sqrt{2}) \times (Z_0 - Z_1)$$

$$L_1 = (1/\sqrt{2}) \times (Z_2 + Z_2)$$

Therefore, the above equations may be calculated and then the modified equations maybe calculated.

Figure 34:
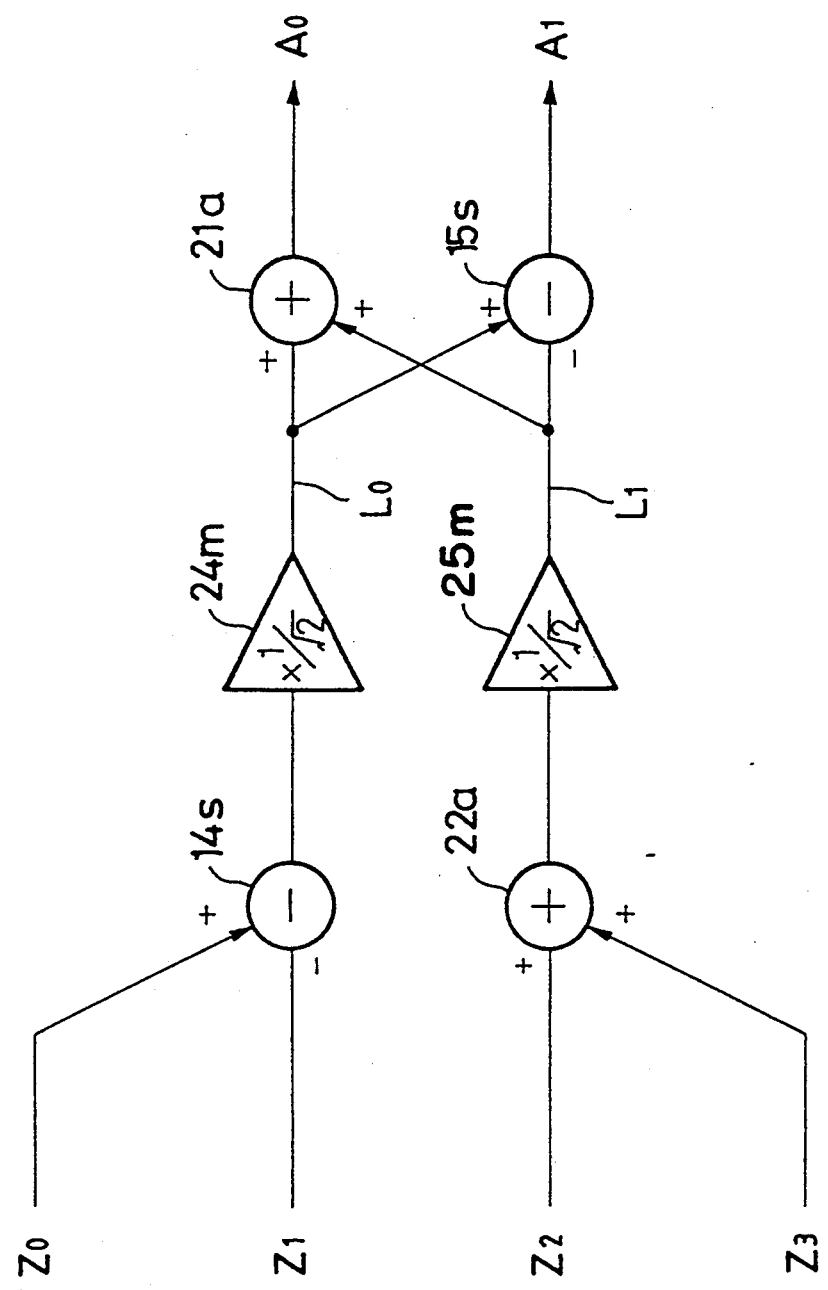
FIG. 34 is a diagram showing a circuit arrangement of a tenth calculating circuit of the matrix calculating circuit according to the present invention.

The above calculations can be realized by a circuit arrangement shown in FIG. 34. As shown in FIG. 34, the values $Z_0$ and $Z_1$ are supplied through a subtractor 14s and a multiplier 24m of $\times 1\sqrt{2}$ to an adding input of an adder 21a and a subtracting input of the subtractor 15s.

The values $Z_2$ and $Z_3$ are supplied through an adder 22a and a multiplier 25m of $\times 1/\sqrt{2}$ to an adding input of an adder 21a and the subtracting input of the subtractor 15s.

In this circuit, the multipliers 24m, 25m may be disposed in two pairs ahead of the adder 22a and the subtractor 14s.

Then, the value $A_0$ is obtained from the added output of the adder 21a and the value $A_1$ is obtained from the subtracted output of the subtractor 15s.

Accordingly, in this circuit, the values $A_0$ and $A_1$ can be obtained by two multiplications and the number of multiplications can be reduced.

As described above, according to this apparatus, by factorizing the constant and repeating the same coefficients, the number of calculation speed (multiplication) in the 4-degree inner product calculating circuit. Therefore, the calculation speed can be increased and the processing speed of the apparatus can be increased on the whole.

The above matrix [V] and the transposed matrix t[V] are calculated by the matrix calculating circuit of the present invention as follows.

The calculation of matrix [V] is a circuit that calculates output data (bb0, bb1, bb2, . . . bb63) from input data (aa0, aa1, aa2, . . . , aa63). Also, the calculation of transposed matrix t[V] is a circuit that calculates output data (dd0, dd1, dd2, . . . , dd63) from input data (cc0, cc1, cc2, . . . , cc63).

$$\begin{bmatrix} bb0 \\ bb1 \\ \cdot \\ \cdot \\ \cdot \\ bb63 \end{bmatrix} = [V] \begin{bmatrix} aa0 \\ aa1 \\ \cdot \\ \cdot \\ \cdot \\ aa63 \end{bmatrix} \quad (13)$$

$$\begin{bmatrix} dd0 \\ dd1 \\ \vdots \\ dd63 \end{bmatrix} = +[V] \begin{bmatrix} cc0 \\ cc1 \\ \vdots \\ cc63 \end{bmatrix} \quad (14)$$

The calculation for calculating bb0, bb1, bb2, bb3 from aa0, aa1, aa2, aa3 is merely addition and subtraction, which can be calculated by known adding circuits and subtracting circuits. Therefore, they need not be described.

From the matrix [V], $$\begin{bmatrix} bb4 \\ bb5 \end{bmatrix} = \begin{bmatrix} 1 & 0 & 1/\sqrt{2} & 1/\sqrt{2} \\ 1 & 0 & -1/\sqrt{2} & -1/\sqrt{2} \end{bmatrix} \begin{bmatrix} aa4 \\ aa5 \\ aa6 \\ aa7 \end{bmatrix} \quad (15)$$

Accordingly, input data $X_0$, $X_1$, $X_2$, $X_3$ can be calculated by a circuit shown in FIG. 32 which calculates the above equation. That is, having considered $X_0$=aa4, $X_1$=aa5, $X_2$=aa6, $X_3$=aa7, $Y_0$=bb4 and $Y_1$=bb5, the above data can be calculated by using the circuit shown in FIG. 32.

From the matrix [V], $$\begin{bmatrix} bb6 \\ bb7 \end{bmatrix} = \begin{bmatrix} 0 & -1 & 1/\sqrt{2} & -1/\sqrt{2} \\ 0 & 1 & 1/\sqrt{2} & -1/\sqrt{2} \end{bmatrix} \begin{bmatrix} aa4 \\ aa5 \\ aa6 \\ aa7 \end{bmatrix} \quad (16)$$

Accordingly, the above input data $X_0$, $X_1$, $X_2$, $X_3$ can be calculated by the circuit shown in FIG. 32 that calculates the above equation. That is, having considered that $X_0$=−aa5, $X_1$=aa4, $X_2$=aa6, $X_3$=−aa7, $Y_0$=bb6 and $Y_1$=−bb7, the above data can be calculated by using the circuit shown in FIG. 32.

Also, from the matrix [V], $$\begin{bmatrix} bb8 \\ bb10 \end{bmatrix} = \begin{bmatrix} \cos(2\pi/16) & \cos(2\pi/16) & \cos(6\pi/16) & \cos(6\pi/16) \\ \cos(2\pi/16) & -\cos(2\pi/16) & \cos(6\pi/16) & -\cos(6\pi/16) \end{bmatrix} \begin{bmatrix} aa8 \\ aa9 \\ aa10 \\ aa11 \end{bmatrix} \quad (17)$$

Accordingly, the above input data $V_0$, $V_1$, $V_2$, $V_3$ can be calculated by using the circuit shown in FIG. 31 that calculates the above equation. That is, having considered that $V_0$=aa8, $V_1$=aa9, $V_2$=aa10, $V_3$=aa11, $W_0$=bb8 and $W_1$=bb10, the calculation can be carried out by the circuit shown in FIG. 31.

From the matrix [V], $$\begin{bmatrix} bb9 \\ bb11 \end{bmatrix} = \begin{bmatrix} -\cos(6\pi/16) & -\cos(6\pi/16) & \cos(2\pi/16) & \cos(2\pi/16) \\ -\cos(6\pi/16) & \cos(6\pi/16) & \cos(2\pi/16) & -\cos(2\pi/16) \end{bmatrix} \begin{bmatrix} aa8 \\ aa9 \\ aa10 \\ aa11 \end{bmatrix} \quad (18)$$

Accordingly, the above input data $V_0$, $V_1$, $V_2$, $V_3$ can be calculated by the circuit shown in FIG. 31 that calculates the above equation. That is, having considered that $V_0$=aa10, $V_1$=aa11, $V_2$=−aa8, $V_3$=−aa9, $W_0$=bb9 and $W^1$=bb11, the above data can be calculated by the circuit shown in FIG. 31.

Further, the calculation for obtaining bb12, bb13, bb14, bb15 from aa12, aa13, aa14, aa15 is the same as the calculation for calculating bb8, bb9, bb10, bb11 from aa8, aa9, aa10, aa11 and therefore need not be described.

From the matrix [V], $$\begin{bmatrix} bb16 \\ bb19 \end{bmatrix} = \begin{bmatrix} \cos(\pi/16) & \cos(5\pi/16) & \cos(3\pi/16) & -\cos(7\pi/16) \\ \cos(7\pi/16) & \cos(3\pi/16) & -\cos(5\pi/16) & \cos(\pi/16) \end{bmatrix} \begin{bmatrix} aa16 \\ aa17 \\ aa18 \\ aa19 \end{bmatrix} \quad (19)$$

Accordingly, the above input data $T_0$, $T_1$, $T_2$, $T_3$ can be calculated by using the circuits shown in FIG. 29 or 30 that calculates the above equation. That is, having considered that $T_0$=aa18, $T_1$=aa16, $T_2$=−aa19, $T_3$=aa17, $U_0$=bb16 and $U_1$=bb19, the above input data can be calculated by the circuits shown in FIG. 29 or 30.

From the matrix [V], $$\begin{bmatrix} bb17 \\ bb49 \end{bmatrix} = \begin{bmatrix} -\cos(3\pi/16) & \cos(\pi/16) & \cos(7\pi/16) & -\cos(5\pi/16) \\ -\cos(5\pi/16) & -\cos(7\pi/16) & \cos(\pi/16) & \cos(3\pi/16) \end{bmatrix} \begin{bmatrix} aa16 \\ aa17 \\ aa18 \\ aa19 \end{bmatrix} \quad (20)$$

Accordingly, the above input data $T_0$, $T_1$, $T_2$ and $T_3$ can be calculated by using the circuit shown in FIG. 29 or 30 that calculates the above equation. That is, having considered that $T_O$=−aa16, $T_1$=aa17, $T_2$=aa18. $T_3$=−aa19, $U_0$=bb17 and $U_1$=−bb18, the above input data can be calculated by using the circuit shown in FIG. 29 or 30.

From the matrix [V], $$\begin{bmatrix} bb20 \\ bb23 \end{bmatrix} = \begin{bmatrix} \cos(\pi/16) & -\cos(7\pi/16) & \cos(5\pi/16) & \cos(3\pi/16) \\ \cos(7\pi/16) & \cos(\pi/16) & \cos(3\pi/16) & -\cos(5\pi/16) \end{bmatrix} \begin{bmatrix} aa20 \\ aa21 \\ aa22 \\ aa23 \end{bmatrix} \quad (21)$$

Accordingly, the above input data $T_0$, $T_1$, $T_2$ and $T_3$ can be calculated by using the circuit shown in FIG. 29 or 30 that calculates the above equation. That is, having considered that $T_0 = aa23$, $T_1 = aa20$, $T_2 = -aa21$, $T_3 = aa22$, $U_0 = bb20$ and $U_1 = bb23$, the above input data can be calculated by using the circuit shown in FIG. 29 or 30.

From the matrix [V], $$\begin{bmatrix} bb21 \\ bb22 \end{bmatrix} = \begin{bmatrix} -\cos(3\pi/16) & -\cos(5\pi/16) & \cos(\pi/16) & \cos(7\pi/16) \\ -\cos(5\pi/16) & \cos(3\pi/16) & -\cos(7\pi/16) & \cos(\pi/16) \end{bmatrix} \begin{bmatrix} aa20 \\ aa21 \\ aa22 \\ aa23 \end{bmatrix} \quad (22)$$

Accordingly, the above input data $T_0$, $T_1$, $T_2$ and $T_3$ can be calculated by using the circuit shown in FIG. 29 or 30 that calculates the above equation. That is, having considered that $T_0 = -aa20$, $T_1 = aa22$, $T_2 = aa23$, $T_3 = -aa21$, $U_0 = bb21$ and $U_1 = -bb22$, the above input data can be calculated by using the circuit shown in FIG. 29 or 30.

From the matrix [V], $$\begin{bmatrix} bb24 \\ bb27 \end{bmatrix} = \begin{bmatrix} \cos(\pi/16) & \cos(7\pi/16) & \cos(5\pi/16) & \cos(3\pi/16) \\ -\cos(7\pi/16) & \cos(\pi/16) & -\cos(3\pi/16) & \cos(5\pi/16) \end{bmatrix} \begin{bmatrix} aa24 \\ aa25 \\ aa26 \\ aa27 \end{bmatrix} \quad (23)$$

From the matrix [V], $$\begin{bmatrix} bb25 \\ bb26 \end{bmatrix} = \begin{bmatrix} -\cos(3\pi/16) & \cos(5\pi/16) & \cos(\pi/16) & \cos(7\pi/16) \\ -\cos(5\pi/16) & -\cos(3\pi/16) & -\cos(7\pi/16) & \cos(\pi/16) \end{bmatrix} \begin{bmatrix} aa24 \\ aa25 \\ aa26 \\ aa27 \end{bmatrix} \quad (24)$$

Accordingly, the above input data $T_0$, $T_1$, $T_2$ and $T_3$ can be calculated by using the circuit shown in FIG. 29 or 30 that calculates the above equation. That is, having considered that $T_0 = -aa24$, $T_1 = aa26$, $T_2 = aa27$, $T_3 = aa25$, $U_0 = bb25$ and $U_1 = -bb26$, the above input data can be calculated by using the circuit shown in FIG. 29 or 30.

Further, the calculation for obtaining bb28, bb29, bb30, bb31 from aa28, aa29, aa30, aa31 is the same as the calculation that calculates bb16, bb17, bb18, bb19 from aa16, aa17, aa18, aa19 and therefore need not be described.

Furthemore, the calculation for obtaining bb32, ..., bb47 from aa32, ..., aa47 is the same as the calculation that calculates bb16, ..., bb31 from aa16, ..., aa31 and therefore need not be described.

From the matrix [V], $$\begin{bmatrix} bb48 \\ bbv49 \\ bb50 \\ bb51 \end{bmatrix} = \begin{bmatrix} 1 & 1/\sqrt{2} & \cos(2\pi/16) & -\cos(6\pi/16) \\ 1 & -1/\sqrt{2} & \cos(6\pi/16) & \cos(2\pi/16) \\ 1 & -1/\sqrt{2} & -\cos(6\pi/16) & -\cos(2\pi/16) \\ 1 & (1/)\sqrt{2} & -\cos(2\pi/16) & \cos(6\pi/16) \end{bmatrix} \begin{bmatrix} aa48 \\ aa49 \\ aa50 \\ aa51 \end{bmatrix} \quad (25)$$

Accordingly, the above input data $P_0$, $P_1$, $P_2$, $P_3$ can be calculated by using the circuit shown in FIG. 28 that calculates the above equation. That is, having considered that $P0_0 = aa48$, $P_1 = aa49$, $P_2 = aa50$, $P_2 = aa51$, $Q_0 = bb48$, $Q_1 = bb49$, $Q_2 = bb50$ and $Q_3 = bb51$, the above input data can be calculated by the circuit shown in FIG. 28.

From the matrix [V], $$\begin{bmatrix} bb52 \\ bb53 \\ bb54 \\ bb55 \end{bmatrix} = \begin{bmatrix} 1 & 1/\sqrt{2} & \cos(2\pi/16) & \cos(6\pi/16) \\ -1 & 1/\sqrt{2} & -\cos(6\pi/16) & \cos(2\pi/16) \\ -1 & 1/\sqrt{2} & \cos(6\pi/16) & -\cos(2\pi/16) \\ -1 & -1/\sqrt{2} & \cos(2\pi/16) & \cos(6\pi/16) \end{bmatrix} \begin{bmatrix} aa52 \\ aa53 \\ aa54 \\ aa55 \end{bmatrix} \quad (26)$$

Accordingly, the above input data $P_0$, $P_1$, $P_2$, $P_3$ can be calculated by using the circuit shown in FIG. 28 that calculates the above equation. That is, having considered that $P_0=aa52$, $P_1=aa53$, $P_2=aa54$, $P_3=-aa55$, $Q_0=bb52$, $Q_1=-bb53$, $Q_2=-bb54$ and $Q_3=-bb55$, the above input data can be calculated by the circuit shown in FIG. 28.

From the matrix [V], $$\begin{bmatrix} bb56 \\ bb57 \\ bb58 \\ bb59 \end{bmatrix} = \begin{bmatrix} 1 & 1/\sqrt{2} & \cos(2\pi/16) & \cos(6\pi/16) \\ -1 & 1/\sqrt{2} & -\cos(6\pi/16) & \cos(2\pi/16) \\ 1 & -1/\sqrt{2} & -\cos(2\pi/16) & -\cos(6\pi/16) \\ 1 & 1/\sqrt{2} & -\cos(2\pi/16) & -\cos(6\pi/16) \end{bmatrix} \begin{bmatrix} aa56 \\ aa57 \\ aa58 \\ aa59 \end{bmatrix} \quad (27)$$

Accordingly, the above input data $P_0$, $P_1$, $P_2$, $P_3$ can be calculated by using the circuit shown in FIG. 28 that calculates the above equation. That is, having considered that $P_0=aa56$, $P_1=aa57$, $P_2=aa58$, $P_3=-aa59$, $Q_0=bb56$, $Q_1=-bb57$, $Q_2=bb58$ and $Q_3=-bb59$, the above input data can be calculated by the circuit shown in FIG. 28.

$$\begin{bmatrix} bb60 \\ bb61 \\ b62 \\ bb63 \end{bmatrix} =$$

$$\begin{bmatrix} 1 & -1/\sqrt{2} & \cos(2\pi/16) & \cos(6\pi/16) \\ -1 & -1/\sqrt{2} & -\cos(6\pi/16) & \cos(2\pi/16) \\ 1 & 1/\sqrt{2} & -\cos(6\pi/16) & \cos(2\pi/16) \\ -1 & 1/\sqrt{2} & \cos(2\pi/16) & \cos(6\pi/16) \end{bmatrix} \begin{bmatrix} aa60 \\ aa61 \\ aa62 \\ aa63 \end{bmatrix}$$

Accordingly, the above input data $P_0$, $P_1$, $P_2$, $P_3$ can be calculated by using the circuit shown in FIG. 28 that calculates the above equation. That is, having considered that $P_0=aa60$, $P_1=-aa61$, $P_2=aa62$, $P_3=-aa63$, $Q_0=bb60$, $Q_1=-bb61$, $Q_2=bb62$ and $Q_3=-bb63$, the above input data can be calculated by the circuit shown in FIG. 28.

As described above, the above matrix [V] can be calculated by using the matrix calculating circuit of the present invention.

The calculation for obtaining dd0, dd1, dd2, dd3 from cc0, cc1, cc2, cc3 is merely addition and subtraction and can be effected by well-known adding and subtracting circuits, which therefore need not be described.

Further, the calculation for obtaining dd4, dd5 from cc4, cc5, cc6, cc7 is merely addition and subtraction and can be calculated by well-known adding and subtracting circuits, which therefore need not be described.

From the transposed matrix $^t[V]$, $$\begin{bmatrix} dd6 \\ dd7 \end{bmatrix} = \begin{bmatrix} 1/\sqrt{2} & -1/\sqrt{2} & 1/\sqrt{2} \\ 1/\sqrt{2} & -1/\sqrt{2} & -1/\sqrt{2} & -1/\sqrt{2} \end{bmatrix} \begin{bmatrix} cc4 \\ cc5 \\ cc6 \\ cc7 \end{bmatrix} \quad (29)$$

Accordingly, the input data $Z_0$, $Z_1$, $Z_2$, $Z_3$ can be calculated by using the circuit shown in FIG. 34 that calculates the above equation. That is, having considered that $Z_0=cc4$, $Z_1=cc5$, $Z_2=cc6$, $Z_3=cc7$, $A_0=dd6$, $A_1=dd7$, the above input data can be calculated by the circuit shown in FIG. 34.

From the transposed matrix $^t[V]$, $$\begin{bmatrix} dd8 \\ dd9 \end{bmatrix} = \begin{bmatrix} \cos(2\pi/16) & -\cos(6\pi/16) & \cos(2\pi/16) & -\cos(6\pi/16) \\ \cos(2\pi/16) & -\cos(6\pi/16) & -\cos(2\pi/16) & \cos(6\pi/16) \end{bmatrix} \begin{bmatrix} cc8 \\ cc9 \\ cc10 \\ cc11 \end{bmatrix} \quad (30)$$

Accordingly, the input data $V_0$, $V_1$, $V_2$, $V_3$ can be calculated by using the circuit shown in FIG. 31 that calculates the above equation. That is, having considered that $V_0=cc8$, $V_1=cc10$, $V_2=-cc9$, $V_3=-cc11$, $W_0=dd8$, $W_1=dd9$, the above input data can be calculated by the circuit shown in FIG. 31.

From the transposed matrix $^t[V]$, $$\begin{bmatrix} dd10 \\ dd11 \end{bmatrix} = \begin{bmatrix} \cos(6\pi/16) & \cos(2\pi/16) & \cos(6\pi/16) & \cos(2\pi/16) \\ \cos(6\pi/16) & \cos(2\pi/16) & -\cos(6\pi/16) & -\cos(2\pi/16) \end{bmatrix} \begin{bmatrix} cc8 \\ cc9 \\ cc10 \\ cc11 \end{bmatrix} \quad (31)$$

Accordingly, the input data $V_0$, $V_1$, $V_2$, $V_3$ can be calculated by using the circuit shown in FIG. 31 that calculates the above equation. That is, having considered that $V_0=cc9$, $V_1=cc11$, $V_2=cc8$, $V_3=cc10$, $W_0=dd10$, $W_1=dd11$ the above input data can be calculated by the circuit shown in FIG. 31.

Further, the calculation for obtaining dd12, dd13, dd14, dd15 from cc12, cc13, cc14, cc15 is the same as the calculation that obtains dd8, dd9, dd10, dd11 from cc8, cc9, cc10, cc11 and therefore need not be described.

From the transposed matrix t[V], $$\begin{bmatrix} dd16 \\ dd19 \end{bmatrix} = \begin{bmatrix} \cos(\pi/16) & -\cos(3\pi/16) & -\cos(5\pi/16) & \cos(7\pi/16) \\ -\cos(7\pi/16) & -\cos(5\pi/16) & \cos(3\pi/16) & \cos(\pi/16) \end{bmatrix} \begin{bmatrix} cc16 \\ cc17 \\ cc18 \\ cc19 \end{bmatrix} \quad (32)$$

Accordingly, the above input data $T_0$, $T_1$, $T_2$, $T_3$ can be calculated by using the circuit shown in FIG. 29 or 30 that calculates the above equation. Having considered that $t_0 = -cc17$, $T_1 = cc16$, $T_2 = cc19$, $T_3 = -cc18$, $U_0 = dd16$ and $U_1 = -dd19$, the above input data can be calculated by the circuit shown in FIG. 29 or 30.

From the transposed matrix $^t[V]$, $$\begin{bmatrix} dd17 \\ dd18 \end{bmatrix} = \begin{bmatrix} \cos(5\pi/16) & \cos(\pi/16) & -\cos(7\pi/16) & \cos(3\pi/16) \\ \cos(3\pi/16) & -\cos(7\pi/16) & \cos(\pi/16) & -\cos(5\pi/16) \end{bmatrix} \begin{bmatrix} cc16 \\ cc17 \\ cc18 \\ cc19 \end{bmatrix} \quad (33)$$

Accordingly, the above input data $T_0$, $T_1$, $T_2$, $T_3$ can be calculated by using the circuit shown in FIG. 29 or 30 that calculates the above equation. Having considered that $t_0 = -cc19$, $T_1 = cc17$, $T_2 = -cc18$, $T_3 = cc16$, $U_0 = dd17$ and $U_1 = dd18$, the above input data can be calculated by the circuit shown in FIG. 29 or 30.

From the transposed matrix $^t[V]$, $$\begin{bmatrix} dd20 \\ dd21 \end{bmatrix} = \begin{bmatrix} \cos(\pi/16) & -\cos(3\pi/16) & -\cos(5\pi/16) & \cos(7\pi/16) \\ -\cos(7\pi/16) & -\cos(5\pi/16) & \cos(3\pi/16) & \cos(\pi/16) \end{bmatrix} \begin{bmatrix} cc20 \\ cc21 \\ cc22 \\ cc23 \end{bmatrix} \quad (34)$$

Accordingly, the above input data $T_0$, $T_1$, $T_2$, $T_3$ can be calculated by using the circuit shown in FIG. 29 or 30 that calculates the above equation. Having considered that $t_0 = -cc21$, $T_1 = cc20$, $T_2 = cc23$, $T_3 = -cc22$, $U_0 = dd20$ and $U_1 = -dd21$, the above input data can be calculated by the circuit shown in FIG. 29 or 30.

From the transposed matrix $^t[V]$, $$\begin{bmatrix} dd22 \\ dd23 \end{bmatrix} = \begin{bmatrix} \cos(5\pi/16) & \cos(\pi/16) & -\cos(7\pi/16) & \cos(3\pi/16) \\ \cos(3\pi/16) & \cos(7\pi/16) & \cos(\pi/16) & -\cos(5\pi/16) \end{bmatrix} \begin{bmatrix} cc20 \\ cc21 \\ cc22 \\ cc23 \end{bmatrix} \quad (35)$$

Accordingly, the above input data $T_0$, $T_1$, $T_2$, $T_3$ can be calculated by using the circuit shown in FIG. 29 or 30 that calculates the above equation. Having considered that $t_0 = cc23$, $T_1 = cc21$, $T_2 = -cc22$, $T_3 = cc20$, $U_0 = dd22$ and $U_1 = dd23$, the above input data can be calculated by the circuit shown in FIG. 29 or 30.

From the transposed matrix $^t[V]$, $$\begin{bmatrix} dd24 \\ dd25 \end{bmatrix} = \begin{bmatrix} \cos(\pi/16) & -\cos(3\pi/16) & -\cos(5\pi/16) & -\cos(7\pi/16) \\ \cos(7\pi/16) & \cos(5\pi/16) & -\cos(3\pi/16) & \cos(\pi/16) \end{bmatrix} \begin{bmatrix} cc24 \\ cc25 \\ cc26 \\ cc27 \end{bmatrix} \quad (36)$$

Accordingly, the above input data $T_0$, $T_1$, $T_2$, $T_3$ can be calculated by using the circuit shown in FIG. 29 or 30 that calculates the above equation. Having considered that $t_0 = -cc25$, $T^1 = cc24$, $T_2 = -cc27$, $T_3 = -cc26$, $U_0 = dd24$ and $U_1 = dd25$, the above input data can be calculated by the circuit shown in FIG. 29 or 30.

From the transposed matrix $^t[V]$, $$\begin{bmatrix} dd26 \\ dd27 \end{bmatrix} = \begin{bmatrix} \cos(5\pi/16) & \cos(\pi/16) & -\cos(7\pi/16) & -\cos(3\pi/16) \\ \cos(3\pi/16) & \cos(7\pi/16) & \cos(\pi/16) & -\cos(5\pi/16) \end{bmatrix} \begin{bmatrix} cc24 \\ cc25 \\ cc26 \\ cc27 \end{bmatrix} \quad (37)$$

Accordingly, the above input data $T_0$, $T_1$, $T_2$, $T_3$ can be calculated by using the circuit shown in FIG. 29 or 30 that calculates the above equation. Having considered that $t_0 = cc27$, $T_1 = cc25$, $T_2 = -cc26$, $T_3 = cc24$, $U_0 = dd26$ and $U_1 = dd27$, the above input data can be calculated by the circuit shown in FIG. 29 or 30.

The calculation for obtaining dd28, dd29, dd30, dd31 from cc28, cc29, cc30, cc31 is the same as the calculation that calculates dd16, dd17, dd18, dd19 from cc16, cc17, cc18, cc19 and therefore need not be described.

Further, the calculation for obtaining dd32, ..., dd47 from cc32, ..., cc47 is the same as the calculation that obtains dd16, ..., dd31 from cc16, ..., cc31 and therefore need not be described.

From the transposed matrix $^t[V]$, $$\begin{bmatrix} dd48 \\ dd49 \\ dd50 \\ dd51 \end{bmatrix} = \begin{bmatrix} 1 & 1 & 1 & 1 \\ 1/\sqrt{2} & -1/\sqrt{2} & -1/\sqrt{2} & 1/\sqrt{2} \\ \cos(2\pi/16) & \cos(6\pi/16) & -\cos(6\pi/16) & -\cos(2\pi/16) \\ -\cos(6\pi/16) & \cos(2\pi/16) & -\cos(2\pi/16) & \cos(6\pi/16) \end{bmatrix} \begin{bmatrix} cc48 \\ cc49 \\ cc50 \\ cc51 \end{bmatrix} \quad (38)$$

Accordingly, the input data $R_0$, $R_1$, $R_2$, $R_3$ can be calculated by using the circuit shown in FIG. 33 that calculates the above equation. That is, having considered that $R_0=cc48$, $R_1=cc49$, $R_2=cc50$, $R_3=cc51$, $S_0=dd48$, $S_1=dd49$, $S_2=dd50$ and $S_3=dd51$, the above input data can be calculated by the circuit shown in FIG. 33.

From the transposed matrix $^t[V]$, $$\begin{bmatrix} dd52 \\ dd53 \\ dd54 \\ dd55 \end{bmatrix} = \begin{bmatrix} 1 & -1 & -1 & -1 \\ 1/\sqrt{2} & 1/\sqrt{2} & 1/\sqrt{2} & -1/\sqrt{2} \\ \cos(2\pi/16) & -\cos(6\pi/16) & -\cos(6\pi/16) & \cos(6\pi/16) \end{bmatrix} \begin{bmatrix} cc52 \\ cc53 \\ cc54 \\ cc55 \end{bmatrix} \quad (39)$$

Accordingly, the input data $R_0$, $R_1$, $R_2$, $R_3$ can be calculated by using the circuit shown in FIG. 33 that calculates the above equation. That is, having considered that $R_0=cc52$, $R_1=-cc53$, $R_2=-cc54$, $R_3=-cc55$, $S_0=dd52$, $S_1=dd53$, $S_2=dd54$ and $S_3=dd55$, the above input data can be calculated by the circuit shown in FIG. 33.

From the transposed matrix $^t[V]$, $$\begin{bmatrix} dd56 \\ dd57 \\ dd58 \\ dd59 \end{bmatrix} = \begin{bmatrix} 1 & -1 & 1 & 1 \\ 1/\sqrt{2} & 1/\sqrt{2} & -1/\sqrt{2} & 1/\sqrt{2} \\ \cos(2\pi/16) & -\cos(6\pi/16) & -\cos(6\pi/16) & -\cos(2\pi/16) \\ \cos(6\pi/16) & \cos(2\pi/16) & \cos(2\pi/16) & -\cos(6\pi/16) \end{bmatrix} \begin{bmatrix} cc56 \\ cc57 \\ cc58 \\ cc59 \end{bmatrix} \quad (40)$$

Accordingly, the input data $R_0$, $R_1$, $R_2$, $R_3$ can be calculated by using the circuit shown in FIG. 33 that calculates the above equation. That is, having considered that $R_0=cc56$, $R_1=-cc57$, $R_2=cc58$, $R_3=cc59$, $S_0=dd56$, $S_1=dd57$, $S_2=dd58$ and $S_3=-dd59$, the above input data can be calculated by the circuit shown in FIG. 33.

From the transposed matrix $^t[V]$, $$\begin{bmatrix} dd60 \\ dd61 \\ dd62 \\ dd63 \end{bmatrix} = \begin{bmatrix} 1 & -1 & 1 & -1 \\ -1/\sqrt{2} & -1/\sqrt{2} & 1/\sqrt{2} & 1/\sqrt{2} \\ \cos(2\pi/16) & -\cos(6\pi/16) & -\cos/16) & \cos(2\pi/16) \\ \cos(6\pi/16) & \cos(2\pi/16) & \cos(2\pi/16) & \cos(6\pi/16) \end{bmatrix} \begin{bmatrix} cc60 \\ cc61 \\ cc62 \\ cc63 \end{bmatrix} \quad (41)$$

Accordingly, the input data $R_0$, $R_1$, $R_2$, $R_3$ can be calculated by using the circuit shown in FIG. 33 that calculates the above equation. That is, having considered that $R_0=cc60$, $R_1=-cc61$, $R_2=cc62$, $R_3=-cc63$, $S_0=dd60$, $S=-dd61$, $S_2=dd62$ and $S_3=dd63$, the above input data can be calculated by the circuit shown in FIG. 33.

As described above, the above-mentioned transposed matrix $^t[V]$ can be calculated by using the matrix circuit of the present invention.

As set forth above, according to the present invention, by factorizing the constant and repeating the same coefficient, the number of the calculation processing (multiplication) in the 4-degree inner product calculating circuit can be reduced. Therefore, the calculation speed can be increased and the high speed processing of the apparatus can be realized on the whole.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A discrete cosine transform apparatus having an inner product calculating circuit for calculating an inner product of a matrix and a rearranging circuit for rearranging a data component of a matrix in a predetermined order, comprising:

a four-degree first inner product calculating circuit having coefficients of +1 and −1;

an 8-degree second inner product calculating circuit having coefficients of 0, +1 and −1; and a third inner product calculating circuit including a memory in which a data component of a constant matrix is stored, wherein input data of 8 rows and 8 columns is supplied through a first rearranging circuit to said first inner product calculating circuit, an output of said first inner product calculating circuit is supplied through a second rearranging circuit to said second inner product calculating circuit, an output of said second inner product calculating circuit is directly supplied to said third inner product calculating circuit, and an output of said third inner product calculating circuit is delivered through a third rearranging circuit.

2. An inverse discrete cosine transform apparatus having an inner product calculating circuit for calculating an inner product of a matrix and a rearranging circuit for rearranging a data component of a matrix in a predetermined order, comprising:
- a first inner product calculating circuit having a memory in which a data component of a constant matrix is stored;
- an 8-degree second inner product calculating circuit having coefficients of 0, +1 and −1; and
- a 4-degree third inner product calculating circuit having coefficients of +1 and −1, wherein input data of 8 rows and 8 columns is supplied through a first rearranging circuit to said first inner product calculating circuit, an output of said first inner product calculating circuit is directly supplied to said second inner product calculating circuit, an output of said second inner product calculating circuit is supplied through a second rearranging circuit to said third inner product calculating circuit, and an output of said third inner product calculating circuit is delivered through a third rearranging circuit.

3. A discrete cosine transform apparatus having an inner product calculating circuit for calculating an inner product of a matrix and a rearranging circuit for rearranging a data component of a matrix in a predetermined order, comprising:
- a parallel circuit for converting matrix data serially supplied thereto into parallel data;
- a 4-degree first inner product calculating circuits of a predetermined having coefficients of +1 and −1;
- an 8-degree second inner product calculating circuits of said predetermined number having coefficients of 0, +1 and −1; and
- a third inner product calculating circuits of said predetermined number, each having a memory in which a data component of a constant matrix is stored, wherein said first, said second and said third inner product calculating circuits of said predetermined number are provided in parallel to one another, input data of 8 rows and 8 columns is supplied through a first rearranging circuit to said parallel circuit, data of parallel data output from said parallel circuit are supplied to each of said first inner product calculating circuits of said predetermined number, outputs of said first inner product calculating circuits are directly supplied to corresponding inner product calculating circuits of said second inner product calculating circuits of said predetermined number, outputs of said second inner product calculating circuits are directly supplied to corresponding inner product calculating circuits of said third inner product calculating circuits of said predetermined number, and outputs of said third inner product calculating circuits of said predetermined number are converted into serial data and then delivered through a rearranging circuit.

4. An inverse discrete cosine transform apparatus having an inner product calculating circuit for calculating an inner product of a matrix and a rearranging circuit for rearranging a data component of a matrix in a predetermined order, comprising:
- a parallel circuit for converting matrix data serially supplied thereto into parallel data;
- first inner product calculating circuits of a predetermined number, each having a memory in which a data component of a constant matrix is stored;
- 8-degree second inner product calculating circuits of said predetermined number each having coefficients of 0, +1 and −1; and
- 4-degree third inner product calculating circuits of said predetermined number, each having coefficients of +1 and −1, wherein said first, second and third inner product calculating circuits of said predetermined number are provided in parallel to one another, input data of 8 rows and 8 columns is supplied through a first rearranging circuit to said parallel circuit, data of parallel data output from said parallel circuit are supplied to each of said first inner product calculating circuits of said predetermined number, outputs of said first inner product calculating circuits are directly supplied to corresponding inner product calculating circuits of said second inner product calculating circuits of said predetermined number, outputs of said second inner product calculating circuits are directly supplied to corresponding inner product calculating circuits of said third inner product calculating circuits of said predetermined number, and outputs of said third inner product calculating circuits of said predetermined number are converted into serial data and then delivered through a rearranging circuit.

* * * * *